United States Patent
Kim et al.

(10) Patent No.: US 11,546,504 B2
(45) Date of Patent: Jan. 3, 2023

(54) EQUIPMENT UTILIZING HUMAN RECOGNITION AND METHOD FOR UTILIZING THE SAME

(71) Applicant: LG ELECTRONICS INC., Seoul (KR)

(72) Inventors: Young Han Kim, Yongin-si (KR); Sang Hyun Lee, Seoul (KR); Sang Hyun Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 528 days.

(21) Appl. No.: 16/688,823

(22) Filed: Nov. 19, 2019

(65) Prior Publication Data
US 2021/0067684 A1    Mar. 4, 2021

(30) Foreign Application Priority Data

Aug. 27, 2019 (KR) .......................... 10-2019-0105247

(51) Int. Cl.
*H04N 5/232* (2006.01)
*G06N 20/00* (2019.01)
*G06V 40/16* (2022.01)

(52) U.S. Cl.
CPC ......... *H04N 5/23219* (2013.01); *G06N 20/00* (2019.01); *G06V 40/165* (2022.01)

(58) Field of Classification Search
None
See application file for complete search history.

(56) References Cited

U.S. PATENT DOCUMENTS

| | | | | |
|---|---|---|---|---|
| 5,892,520 A | * | 4/1999 | Ioka | G06F 16/786 345/474 |
| 8,581,911 B2 | * | 11/2013 | Becker | G06T 13/80 345/581 |
| 9,532,069 B2 | * | 12/2016 | Pace | H04N 19/54 |
| 10,147,023 B1 | * | 12/2018 | Klaudiny | G06V 10/774 |
| 10,740,385 B1 | * | 8/2020 | Hohwald | G06F 16/55 |
| 2008/0075338 A1 | * | 3/2008 | Muramatsu | G06T 11/60 382/118 |
| 2010/0056146 A1 | * | 3/2010 | Guo | H04W 88/06 455/435.2 |

(Continued)

FOREIGN PATENT DOCUMENTS

| KR | 101825321 | 1/2018 |
|---|---|---|
| KR | 101968101 | 4/2019 |

*Primary Examiner* — Lewis G West
(74) *Attorney, Agent, or Firm* — Lee Hong Degerman Kang & Waimey

(57) ABSTRACT

A method for utilizing human recognition and a method utilizing the same are provided. The method for utilizing human recognition includes updating a moving image database to include information about a moving image in which a cluster subject appears, the information being extracted based on clustering using a face feature; receiving a search condition; and detecting moving image information using the database. According to the present disclosure, a skeleton can be analyzed and a face can be recognized using an artificial intelligence (AI) model performing deep learning through a fifth generation (5G) network, and using the (Continued)

analysis result, a photographing composition can be determined, and moving image information can be constructed at an edge.

18 Claims, 17 Drawing Sheets

(56) References Cited

U.S. PATENT DOCUMENTS

| | | | | |
|---|---|---|---|---|
| 2010/0070483 A1* | 3/2010 | Delgo | ............. | G06F 16/739 |
| | | | | 707/706 |
| 2010/0141663 A1* | 6/2010 | Becker | ............. | G06T 13/80 |
| | | | | 715/764 |
| 2011/0225196 A1* | 9/2011 | Haseyama | ............. | G06F 16/70 |
| | | | | 707/E17.03 |
| 2011/0252035 A1* | 10/2011 | Tanaka | ............. | G06F 16/56 |
| | | | | 707/E17.089 |
| 2013/0243077 A1* | 9/2013 | Mitarai | ............. | G06V 20/46 |
| | | | | 375/240.01 |
| 2014/0035934 A1* | 2/2014 | Du | ............. | G06T 17/20 |
| | | | | 345/474 |
| 2015/0035825 A1* | 2/2015 | Zhou | ............. | G06V 40/171 |
| | | | | 345/419 |
| 2015/0084950 A1* | 3/2015 | Li | ............. | G06K 9/6247 |
| | | | | 345/419 |
| 2015/0213604 A1* | 7/2015 | Li | ............. | H04N 7/147 |
| | | | | 345/473 |
| 2016/0007058 A1* | 1/2016 | Wang | ............. | G06V 40/103 |
| | | | | 725/116 |
| 2016/0121214 A1* | 5/2016 | Kruglick | ............. | A63F 13/428 |
| | | | | 463/31 |
| 2016/0189006 A1* | 6/2016 | Iliadis | ............. | G06K 9/6256 |
| | | | | 382/118 |
| 2016/0328628 A1* | 11/2016 | Bhat | ............. | G06T 7/60 |
| 2016/0328875 A1* | 11/2016 | Fang | ............. | G06V 40/166 |
| 2017/0060867 A1* | 3/2017 | Moutinho | ............. | G06F 16/56 |
| 2017/0148201 A1* | 5/2017 | Bhat | ............. | G06T 13/40 |
| 2017/0160813 A1* | 6/2017 | Divakaran | ............. | G06N 5/022 |
| 2018/0181596 A1* | 6/2018 | Li | ............. | G06F 16/5838 |
| 2018/0357247 A1* | 12/2018 | Siminoff | ............. | G08B 13/19606 |
| 2019/0139287 A1* | 5/2019 | Weise | ............. | G06T 13/40 |
| 2019/0370982 A1* | 12/2019 | Sasaki | ............. | G06V 10/7715 |
| 2020/0241716 A1* | 7/2020 | Sowden | ............. | G06F 3/0484 |
| 2021/0385215 A1* | 12/2021 | Summers | ............. | H04L 63/102 |
| 2022/0012921 A1* | 1/2022 | Tokuchi | ............. | G06T 11/00 |

* cited by examiner

EQUIPMENT UTILIZING HUMAN RECOGNITION AND METHOD FOR UTILIZING THE SAME

CROSS-REFERENCE TO RELATED APPLICATION

Pursuant to 35 U.S.C. § 119(a), this application claims the benefit of earlier filing date and right of priority to Korean Patent Application No. 10-2019-0105247, filed on Aug. 27, 2019, the content of which are all hereby incorporated by reference herein in its entirety.

BACKGROUND

1. Technical Field

The present disclosure relates to equipment utilizing human recognition and a method for utilizing the same, and more particularly, to a method for obtaining, storing, and playing an image using human recognition technology and equipment using the method.

2. Description of Related Art

Face detection is a field of computer vision, and is a technology indicating a position of a face in an image.

Technologies similar to face detection include face landmark detection technology and face feature (attributes) extraction technology. Face landmark detection technology is a technology for detecting positions of eyes, a nose, lips, and the like in a face. Face recognition is a technology recognizing an identity based on extraction of a face feature.

A camera having a face detection function may recognize a face in an image captured using an image sensor, and focus on the face for photographing.

As one related art, a system and a method for providing feedback for optimum composition for real-time photographing using a mobile camera recognition technology are disclosed in Korean Patent Registration No. 10-1825321. According to this related art, an optimum photographing composition is provided based on a number of recognized faces, and an angle of a camera may be calculated through calculation of a width and a position of the faces.

As another related art, an object recognition camera module using deep learning and an object recognition system including the object recognition camera module are disclosed in Korean Patent Registration No. 10-1968101. According to related art, a face is recognized based an image captured through an infrared camera, and entry/exit of a person may be controlled through authentication according to face recognition.

However, according to an embodiment of the present disclosure, various compositions for a whole body may be recommended based on human body recognition and face recognition, and an image in which a particular person appears may be selectively played and automatically edited. As such, embodiments of the present disclosure may be distinguished from the above-described related art.

SUMMARY OF THE INVENTION

An aspect of the present disclosure is to provide equipment and a method for utilizing human recognition in which a composition suitable for a shot mode is recommended using an artificial intelligence algorithm, in contrast to the related art in which skeleton information is collected via a Kinect sensor.

Another aspect of the present disclosure is to provide equipment and a method for utilizing human recognition, which may be applied to a robot providing a personalized image for visitors to, for example, an exhibition.

Still another aspect of the present disclosure is to provide equipment and a method for utilizing human recognition in which a highlight part of a moving image stored in the equipment may be consecutively played with respect to each person appearing in the moving image through a search for a moving image, or an edited moving image may be generated.

While this disclosure includes specific embodiments, it will be apparent to one of ordinary skill in the art that various changes in form and details may be made in these embodiments without departing from the spirit and scope of claims and their equivalents. The embodiments described herein are to be considered in a descriptive sense only, and not for purposes of limitation. Therefore, the scope of the disclosure is defined not by the detailed description, but by claims and their equivalents, and all variations within the scope of claims and their equivalents are to be construed as being included in the disclosure.

According to an embodiment of the present disclosure, a method for utilizing human recognition may include updating a moving image database to include information about a moving image in which a cluster subject appears, the information being extracted based on clustering using a face feature; receiving a search condition for searching for the information about the moving image in which the cluster subject appears; and detecting information about the moving image in which the cluster subject appears that matches the search condition, using the moving image database.

The updating of the moving image database may include determining an update time based on time information and determination of an idle mode.

The updating of the moving image database may include extracting a face feature of a person for each frame of the extracted moving image; forming a cluster for each cluster subject using the face feature and a clustering model based on machine learning; and generating information about a section in the moving image in which the cluster subject appears.

The forming of the cluster for each cluster subject may include determining a similarity of the face feature, and forming a cluster for each cluster subject based on the similarity.

The method may further include performing a search using the face feature of a person extracted from an image of a face inputted under the search condition.

The method may further include performing a search using information about a person selected from a list of people extracted from the moving image database.

The method may further include displaying information about a moving image by displaying at least one selected from a thumbnail, a moving image identification (ID), a person identification (ID), and information about a section in which a person appears, based on an extracted frame.

The method may further include generating at least one selected from playing back a selected section in which a person appears, continuously playing back the selected section in which the person appears, and moving to and playing back another section in which the person appears, according to a mobile gesture by the user.

The method may further include generating a highlight image using a moving image of a section in which the cluster subject appears, based on the information about the moving image.

The method may further include generating a moving image edited using a moving image of a section in which the cluster subject appears, based on the information about the moving image.

According to another embodiment of the present disclosure, a user equipment utilizing human recognition may include a user input interface configured to receive a search condition for searching for information, and a processor configured to detect target information matching the search condition. The processor may detect the target information using a moving image database including information about a moving image in which a person appears, wherein the person corresponds to a subject of a cluster formed based on clustering using a face feature.

The processor may extract moving image information from a stored moving image and update the moving image database using the moving image information, and determine an update time based on time information and determination of an idle mode.

The processor may extract moving image information from a stored moving image and update the moving image database using the moving image information, extract a face feature of a person for each frame of the extracted moving image information, and form a cluster for each cluster subject using the face feature and a clustering model based on machine learning, and generate information about a section in the moving image in which the cluster subject appears.

The processor may determine a similarity of the face feature, and form a cluster for each cluster subject based on the similarity.

The processor may perform a search using the face feature of a person extracted from an input image of a face.

The processor may perform a search using information about a person selected from a list of the people extracted from the moving image database.

The user input interface may include a touchscreen that displays a user interface (UI) controlled by a mobile gesture of a user. The processor may control displaying of at least one selected from a thumbnail, an identification (ID) of a moving image in which a person appears, a person identification (ID), and information about a section in which the person appears, based on an extracted frame.

The user input interface may include a touchscreen that displays a user interface (UI) controlled by a mobile gesture of a user. The processor may control at least one selected from playing back a selected section in which a person appears, continuously playing back the selected section in which the person appears, and moving to and playing back another section in which the person appears, according to the mobile gesture.

The processor may generate a highlight image using a moving image of a section in which the cluster subject appears based on the moving image information.

The processor may generate a moving image edited using a moving image of a section in which the cluster subject appears based on the moving image information.

A method for human recognition comprises extracting information from a first moving image in which a cluster subject appears, wherein the extracting is based on clustering using a face feature of the cluster subject depicted in the first moving image; storing, in a moving image database, the information from the first moving image; receiving a search condition for searching for moving images in which the cluster subject appears, wherein the moving images are included in the moving image database; and searching the moving image database to identify one or more moving images, among the moving images included in the moving image database, which meet the search condition.

The storing occurs according to an update time based on time information and a determination of being in an idle mode.

The method further comprises extracting a face feature of a person for each frame of the first moving image; forming a cluster for each cluster subject using the face feature and a clustering model based on machine learning; generating further information about a section in the first moving image in which the each cluster subject appears; and storing, in the moving image database, the further information.

The forming of the cluster for each cluster subject comprises: determining a similarity of the face feature; and forming a cluster for each cluster subject based on the similarity.

The method further comprises performing the searching using a face feature of a person as the search condition.

The method further comprises performing the searching using as the search condition information about a person selected from a list of people extracted from the moving image database.

The method further comprises displaying, on a display, information about the identified one or more moving images that includes at least one of a thumbnail, a moving image identification (ID), a person identification (ID), or information about a section in which a person appears.

The method further comprises performing, according to a mobile gesture by a user, at least one of playing back a selected section in which a person appears, continuously playing back the selected section in which the person appears, and moving to and playing back another section in which the person appears.

The method further comprises generating a highlight image using a moving image of a section in which the cluster subject appears, based on the information from the first moving image.

The method further comprises generating a moving image edited using a moving image of a section in which the cluster subject appears, based on the information from the first moving image.

An apparatus for human recognition comprises a user input interface; and a processor configured to extract information from a first moving image in which a cluster subject appears, wherein the extract is based on clustering using a face feature of the cluster subject depicted in the first moving image; store, in a moving image database, the information from the first moving image; receive, via the user input interface, a search condition for searching for moving images in which the cluster subject appears, wherein the moving images are included in the moving image database; and search the moving image database to identify one or more moving images, among the moving images included in the moving image database, which meet the search condition.

The store occurs according to an update time based on time information and a determination of being in an idle mode.

The processor is further configured to extract a face feature of a person for each frame of the first moving image; form a cluster for each cluster subject using the face feature and a clustering model based on machine learning; generate further information about a section in the first moving image in which the each cluster subject appears; and store, in the moving image database, the further information.

The form the cluster for each cluster subject comprises determine a similarity of the face feature; and form a cluster for each cluster subject based on the similarity.

The processor is further configured to perform the search using a face feature of a person as the search condition.

The processor is further configured to perform the search using as the search condition information about a person selected from a list of people extracted from the moving image database.

The apparatus further comprises a display, wherein the processor is further configured to cause the display to display information about the identified one or more moving images that includes at least one of a thumbnail, a moving image identification (ID), a person identification (ID), or information about a section in which a person appears.

The processor is further configured to perform, according to a mobile gesture by a user, at least one of playing back a selected section in which a person appears, continuously playing back the selected section in which the person appears, and moving to and playing back another section in which the person appears.

The processor is further configured to generate a highlight image using a moving image of a section in which the cluster subject appears, based on the information from the first moving image.

The processor is further configured to generate a moving image edited using a moving image of a section in which the cluster subject appears, based on the information from the first moving image.

According to embodiments of the present disclosure, photographing can be performed according to a composition recommended for a ratio of a recognized human body.

In addition, a composition suitable for a shot mode based on recognition of a human body can be recommended to a user.

In addition, a personalized moving image album can be created by detecting a section of a moving image in which a specific person appears.

In addition, a personally-requested moving image can be created by detecting a section in which a specific visitor appears among images of visitors captured according to a method for utilizing human recognition, performed by a robot at, for example, an exhibition.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
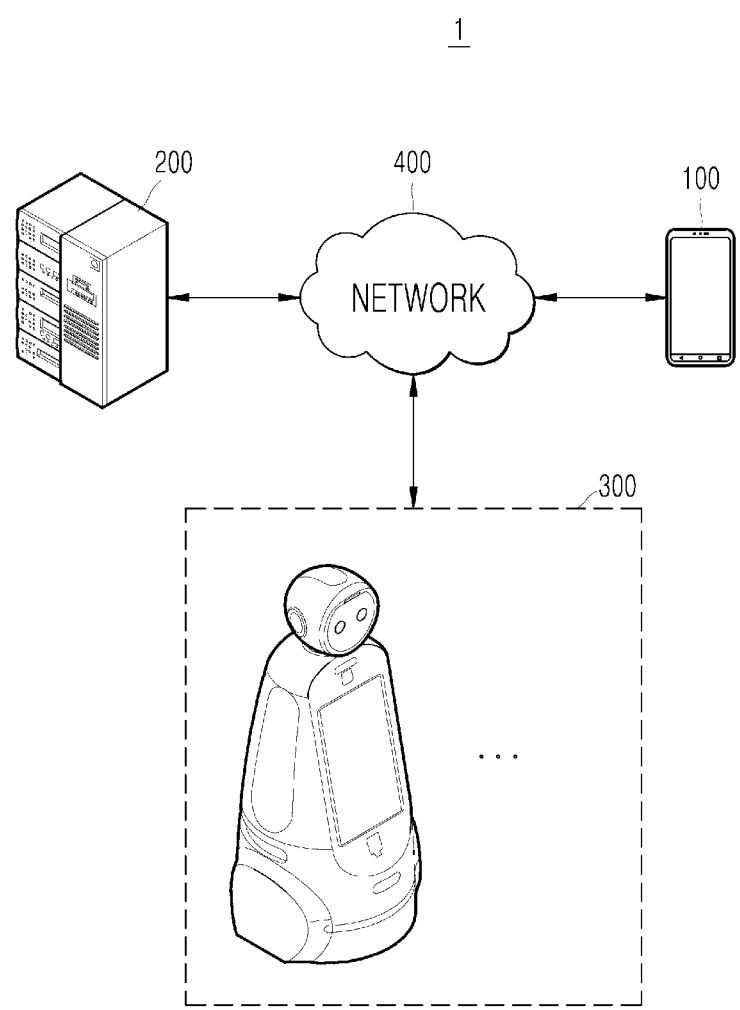
FIG. 1 is an exemplary view of a network environment connected to equipment using human recognition according to an embodiment of the present disclosure.

Hereinafter, the embodiments disclosed in the present specification will be described in detail with reference to the accompanying drawings, the same or similar elements regardless of a reference numeral is denoted by the same reference numeral and a duplicate description thereof will be omitted. In the following description, the terms "module" and "unit" for referring to elements are assigned and used exchangeably in consideration of convenience of explanation, and thus, the terms per se do not necessarily have different meanings or functions. Wherever possible, the same reference numbers will be used throughout the drawings to refer to the same or like parts. In the following description, known functions or structures, which may confuse the substance of the present disclosure, are not explained. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, third, and the like, may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

FIG. 1 is an exemplary view of a network environment connected to equipment using human recognition according to an embodiment of the present disclosure.

Referring to FIG. 1, a user equipment 100 corresponding to equipment using human recognition according to an embodiment of the present disclosure, a robot 300, and a server 200 are connected to each other via a network 400. The equipment using human recognition according to an embodiment of the present disclosure may include various types of the user equipment 100 and robots 300 having a photographing function.

In detail, the equipment using human recognition may include mobile equipment having a camera, a laptop computer or a desktop computer, or a digital camera of various types, for example, a mirrorless or digital single-lens reflex (DSLR) type.

The robot 300 may include a robot having a camera, and which guides visitors at, for example, an exhibition, and provides a photographing service. Hereinafter, the equipment using human recognition and mobile equipment representing the same are referred to as user equipment 100, and the user equipment 100 is explained as an example.

With respect to an artificial intelligence model explained in an embodiment of the present disclosure, the server 200 provides, to the user equipment 100, various services related to the artificial intelligence model. The artificial intelligence model will be explained in detail below.

The network 400 can be any suitable communication network including a wired and wireless network, for example, a local area network (LAN), a wide area network (WAN), the Internet, an intranet, an extranet, and a mobile network, for example, cellular, 3G, LTE, 5G, Wi-Fi networks, an ad hoc network, and a combination thereof.

The network 400 may include connection of network elements such as hubs, bridges, routers, switches, and gateways. The network 400 may include one or more connected networks, including a public network such as the Internet and a private network such as a secure corporate private network. For example, the network may include a multi-network environment. Access to the network 400 may be provided via one or more wired or wireless access networks.

The user equipment 100 may transmit and receive data with the server 200, which is a learning device, through a 5G network. Particularly, the equipment using human recognition 100 or 300 may perform data communication with the learning device 200 using at least one service of enhanced mobile broadband (eMBB), ultra-reliable and low latency communications (URLLC), or massive machine-type communications (mMTC), through the 5G network.

eMBB is a mobile broadband service, and provides, for example, multimedia contents and wireless data access. In addition, improved mobile services such as hotspots and broadband coverage for accommodating the rapidly growing mobile traffic may be provided via eMBB. Through a hotspot, the high-volume traffic may be accommodated in an area where user mobility is low and user density is high. Through broadband coverage, a wide-range and stable wireless environment and user mobility may be guaranteed.

A URLLC service defines requirements that are far more stringent than existing LTE in terms of reliability and transmission delay of data transmission and reception, and corresponds to a 5G service for production process automation in the industrial field, telemedicine, remote surgery, transportation, safety, and the like.

mMTC is a transmission delay-insensitive service that requires a relatively small amount of data transmission. The mMTC enables a much larger number of terminals 300, such as sensors, than general mobile cellular phones to be simultaneously connected to a wireless access network. In this case, the communication module price of the terminal should be inexpensive, and there is a need for improved power efficiency and power saving technology capable of operating for years without battery replacement or recharging.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of the artificial intelligence into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

An ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

An ANN may be classified as a single-layer neural network or a multi-layer neural network, based on the number of layers therein.

A general single-layer neural network is composed of an input layer and an output layer.

In addition, a general multi-layer neural network is composed of an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

Meanwhile, a deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An ANN trained using training data can classify or cluster inputted data according to a pattern within the inputted data.

Throughout the present specification, an artificial neural network trained using training data may be referred to as a trained model.

Hereinbelow, learning paradigms of an ANN will be described in detail.

Learning paradigms of an ANN may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

In addition, throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

Meanwhile, the training data may exhibit a number of features, and the training data being labeled with the labels may be interpreted as the features exhibited by the training data being labeled with the labels. In this case, the training data may represent a feature of an input object as a vector.

Using training data and labeling data together, the ANN may derive a correlation function between the training data and the labeling data. Then, through evaluation of the function derived from the ANN, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of ANNs using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, an AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An ANN is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an ANN may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In SGD, a momentum and Nesterov accelerate gradient (NAG) are methods for increasing optimization accuracy by adjusting a step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the ANN is first trained by experimentally setting hyperparameters to various values, and based on the results of training, the hyperparameters can be set to optimal values that provide a stable learning rate and accuracy.

The user equipment according to an embodiment of the present disclosure may use a program relating to various artificial intelligence algorithms in a process of generating various artificial intelligence models needed to perform human recognition, face recognition, and object recognition functions, training the artificial intelligence models, evaluating the artificial intelligence models, completing the artificial intelligence models, and updating the artificial intelligence models using personal data of a user. The program may be stored in a local area and the server 200.

Hereinafter, an embodiment of the present disclosure will be described with reference to the user equipment 100 representing the user equipment 100 or 300 using human recognition according to the embodiments of the present disclosure described above. In addition, in the absence of particular assumptions or conditions, the description of the user equipment 100 may also be applied to other embodiments.

The server 200 may collect learning data needed to train various artificial intelligence models, and train the artificial intelligence models using the collected learning data. When the various artificial intelligence models trained by the server 200 are completed through evaluation thereof, the user equipment 100 may use the artificial intelligence models downloaded from the server 200 and stored in a local area to thereby update a moving image database using human body and face recognition and a clustering model. However, the updating of the moving image database may also be performed by using a result value processed by the server 200 using the artificial intelligence models, according to a capacity of a storage device of the user equipment 100 and a processing speed of a processor.

Figure 2:
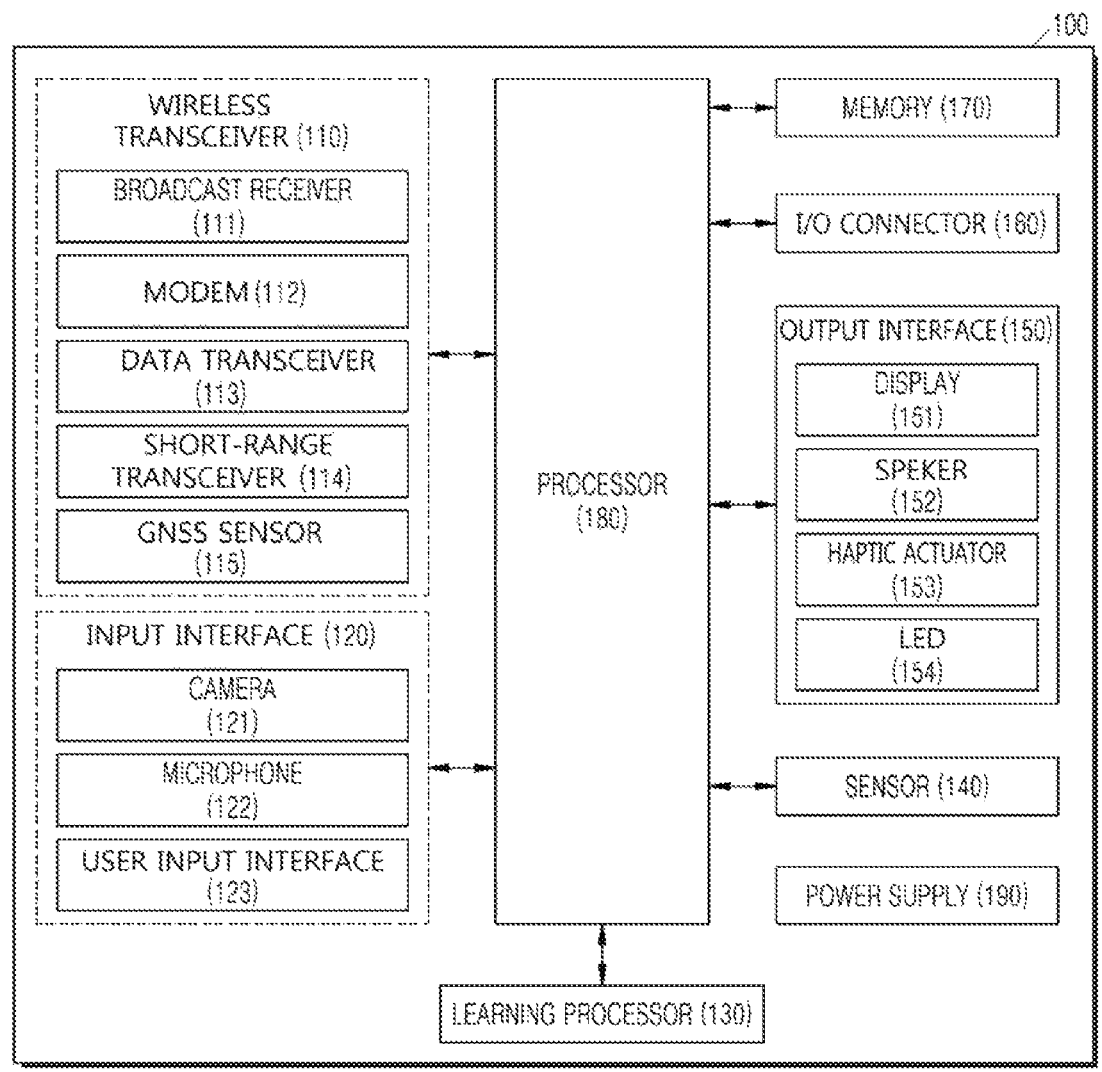
FIG. 2 is a block diagram of user equipment corresponding to the equipment using human recognition according to an embodiment of the present disclosure.

FIG. 2 is a block diagram of user equipment corresponding to the equipment using human recognition according to an embodiment of the present disclosure.

Referring to FIG. 2, the terminal 100 may be implemented as a stationary terminal and a mobile terminal, such as a mobile phone, a projector, a mobile phone, a smartphone, a laptop computer, a terminal for digital broadcast, a personal digital assistant (PDA), a portable multimedia player (PMP), a navigation system, a slate PC, a tablet PC, an Ultrabook, a wearable device (for example, a smartwatch, a smart glass, and a head mounted display (HMD)), a set-top box (STB), a digital multimedia broadcast (DMB) receiver, a radio, a laundry machine, a refrigerator, a desktop computer, and a digital signage.

Further, the terminal 100 may be implemented as various home appliances for household use, and may be also applied to a stationary or mobile robot.

The terminal 100 may perform a function of a voice agent. The voice agent may be a program configured to recognize a voice of a user and output a voice corresponding to the voice of the user.

Referring to FIG. 2, the terminal 100 may include a wireless transceiver 110, an input interface 120, a learning processor 130, a sensor 130, an output interface 150, an I/O connector 160, a memory 170, a processor 180, and a power supply 190.

A trained model may be provided in the terminal 100.

The trained model may be implemented as hardware, software, or a combination of hardware and software, and in cases where the trained model is partially or entirely implemented as software, at least one command constituting the trained model may be stored in the memory 170.

The wireless transceiver 110 may include at least one selected from a broadcast receiver 111, a modem 112, a short-distance transceiver 114, and a GNSS sensor 115.

The broadcast receiver 111 receives broadcast signals and/or broadcast-related information through a broadcast channel from an external broadcast management server.

The modem 112 may transmit/receive a wireless signal to/from at least one of a base station, an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The data transceiver 113 refers to a module for wireless internet access and may be built in or external to the mobile terminal 100. The data transceiver 113 may be configured to transmit/receive a wireless signal in a communication network according to wireless internet technologies.

The wireless internet technologies may include wireless LAN (WLAN), wireless-fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A).

The short-range transceiver 114 may support short-range communication by using at least one of Bluetooth™, radio frequency identification (RFID), Infrared Data Association (IrDA), Ultra Wideband (UWB), ZigBee, near field communication (NFC), Wi-Fi, Wi-Fi Direct, and Wireless Universal Serial Bus (USB) technologies.

The GNSS sensor 115 is a module for obtaining the location (or the current location) of a mobile terminal, and its representative examples include a global positioning system (GPS) module or a Wi-Fi module. For example, the mobile terminal may obtain its position by using a signal transmitted from a GPS satellite through the GPS module.

The input interface 120 may include a camera 121 for inputting an image signal, a microphone 122 for receiving an audio signal, and a user input interface 123 for receiving information inputted from a user.

Voice data or image data collected by the input interface 120 may be analyzed and processed as a user's control command The input interface 120 may obtain data such as training data for training a model, and input data used to obtain an output using the trained model.

The input interface 120 may obtain unprocessed input data, and in this case, the processor 180 or the learning processor 130 may preprocess the obtained data and generate training data or preprocessed input data which can be inputted for model training.

Here, the preprocessing of input data may refer to extracting an input feature from the input data.

The input interface 120 is for inputting of image information (or signal), audio information (or signal), data, or information being inputted from a user, and in order to input the image information, the equipment 100 may include one or a plurality of cameras 121.

The camera 121 processes an image frame such as a still image or a moving image obtained by an image sensor in a video call mode or a photographing mode. The processed image frame may be displayed on the display 151 or stored in the memory 170.

The microphone 122 processes an external sound signal as electrical voice data. The processed voice data may be utilized in various forms in accordance with a function which is being performed by the user equipment 100 (or an application program which is being executed). In the microphone 122, various noise removal algorithms which remove noise generated during the process of receiving the external sound signal may be implemented.

The user input interface 123 receives information from the user, and when the information is inputted through the user input interface 123, the processor 180 may control the operation of the user equipment 100 so as to correspond to the inputted information.

The user input interface 123 may include a mechanical inputter (or a mechanical key, for example, a button located on a front, rear, or side surface of the user equipment 100, a dome switch, a jog wheel, or a jog switch) and a touch type inputter. As an example, the touch type input tool may include a virtual key, a soft key, or a visual key displayed on a touch screen via software processing, or may include a touch key disposed on any portion other than the touch screen.

The learning processor 130 trains a model configured by an ANN using the training data.

Specifically, the learning processor 130 repeatedly trains the ANN using various training schemes previously described to determine optimized model parameters of the ANN.

Throughout the present specification, an ANN of which parameters are determined by being trained using training data may be referred to as a trained model.

Here, the trained model may be used to infer result values for the new input data, rather than the training data.

The learning processor 130 may be configured to receive, classify, store, and output information to be used for data mining, data analysis, intelligent decision making, and machine learning algorithms and techniques.

The learning processor 130 may include one or more memories configured to store data which is received, detected, sensed, generated, previously defined, or outputted by another component, device, the terminal, or a device which communicates with the terminal.

The learning processor 130 may include a memory which is combined with or implemented in the terminal. In some exemplary embodiments, the learning processor 130 may be implemented using the memory 170.

Selectively or additionally, the learning processor 130 may be implemented using a memory related to the terminal, such as an external memory which is directly coupled to the terminal or a memory maintained in the server 200 which communicates with the terminal.

According to another exemplary embodiment, the learning processor 130 may be implemented using a memory maintained in a cloud computing environment or other remote memory locations accessible by the terminal via a communication method such as a network.

In general, the learning processor 130 may be configured to store data in one or more databases to identify, index, categorize, manipulate, store, search, and output data in order to be used for supervised or non-supervised learning, data mining, predictive analysis, or used in the other machine. Here, the database may be implemented using the memory 170, a memory 230 of the learning device 200, a memory maintained in a cloud computing environment or other remote memory locations accessible by the terminal via a communication method such as a network.

Information stored in the learning processor 130 may be used by the processor 180 or one or more controllers of the terminal using an arbitrary one of different types of data analysis algorithms and machine learning algorithms.

Examples of such algorithms include, for example, a k-nearest neighbor system, fuzzy logic (for example, possibility theory), a neural network, a Boltzmann machine, vector quantization, a pulse neural network, a support vector machine, a maximum margin classifier, hill climbing, an inductive logic system, a Bayesian network, (for example, a finite state machine, a Mealy machine, a Moore finite state machine), a classifier tree (for example, a perceptron tree, a support vector tree, a Markov Tree, a decision tree forest, an arbitrary forest), a reading model and system, artificial fusion, sensor fusion, image fusion, reinforcement learning, augmented reality, pattern recognition, and automated planning.

The processor 180 may determine or predict at least one executable operation of the terminal based on information which is determined or generated using the data analysis and the machine learning algorithm. To this end, the processor 180 may request, search, receive, or utilize the data of the learning processor 130 and control the terminal to execute a predicted operation or a desired operation among the at least one executable operation.

The processor 180 may perform various functions which implement intelligent emulation (that is, a knowledge based system, an inference system, and a knowledge acquisition system). This may be applied to various types of systems (for example, a fuzzy logic system) including an adaptive system, a machine learning system, and an artificial neural network.

The processor 180 may include sub modules which enable operations involving voice and natural language voice processing, such as an I/O processor, an environmental condition module, a speech to text (STT) processor, a natural language processor, a workflow processor, and a service processor.

The sub modules may have an access to one or more systems or data and a model, or a subset or a super set thereof in the terminal. Further, each of the sub modules may provide various functions including a glossarial index, user data, a workflow model, a service model, and an automatic speech recognition (ASR) system.

According to another exemplary embodiment, another aspect of the processor 180 or the terminal may be implemented by the above-described sub module, a system, data, and a model.

In some exemplary embodiments, based on the data of the learning processor 130, the processor 180 may be configured to detect and sense requirements based on contextual conditions expressed by user input or natural language input or users intention.

The processor 180 may actively derive and obtain information required to completely determine the requirement based on the contextual conditions or the users intention. For example, the processor 180 may actively derive information required to determine the requirements, by analyzing past data including historical input and output, pattern matching, unambiguous words, and input intention.

The processor 180 may determine a task flow to execute a function responsive to the requirements based on the contextual condition or the user's intention.

The processor 180 may be configured to collect, sense, extract, detect and/or receive a signal or data which is used for data analysis and a machine learning task through one or more sensing components in the terminal, to collect information for processing and storing in the learning processor 130.

The information collection may include sensing information by a sensor, extracting of information stored in the memory 170, or receiving information from other equipment, an entity, or an external storage device through a communicator.

The processor 180 collects usage history information from the terminal and stores the information in the memory 170.

The processor 180 may determine best matching to execute a specific function using stored usage history information and predictive modeling.

The processor 180 may receive or sense surrounding environment information or other information through the sensor 140.

The processor 180 may receive a broadcasting signal and/or broadcasting related information, a wireless signal, or wireless data through the wireless transceiver 110.

The processor 180 may receive image information (or a corresponding signal), audio information (or a corresponding signal), data, or user input information from the input interface 120.

The processor 180 may collect the information in real time, process or classify the information (for example, a knowledge graph, a command policy, a personalized database, or a conversation engine) and store the processed information in the memory 170 or the learning processor 130.

When the operation of the terminal is determined based on data analysis and a machine learning algorithm and technology, the processor 180 may control the components of the terminal to execute the determined operation. Further, the processor 180 may control the equipment in accordance with the control command to perform the determined operation.

When a specific operation is performed, the processor 180 analyzes history information indicating execution of the specific operation through the data analysis and the machine learning algorithm and technology and updates the information which is previously learned based on the analyzed information.

Accordingly, the processor 180 may improve precision of a future performance of the data analysis and the machine learning algorithm and technology based on the updated information, together with the learning processor 130.

The sensor 140 may include one or more sensors which sense at least one of information in the mobile terminal, surrounding environment information around the mobile terminal, and user information.

For example, the sensor 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, or a gas sensor), and a chemical sensor (for example, an electronic nose, a healthcare sensor, or a biometric sensor). In addition, the terminal 100 disclosed in the present disclosure may combine various kinds of information sensed by at least two of the above-mentioned sensors and may use the combined information.

The output interface 150 is intended to generate an output related to a visual, aural, or tactile stimulus and may include at least one of a display 151, speaker 152, haptic actuator 153, and LED 154.

The display 151 displays (outputs) information processed in the user equipment 100. For example, the display 151 may display execution screen information of an application program driven in the user equipment 100 and user interface (UI) and graphic user interface (GUI) information in accordance with the execution screen information.

The display 151 may form a mutual layered structure with a touch sensor, or be formed integrally to be implemented as a touch screen. The touch screen may simultaneously serve as a user input interface 123 which provides an input interface between the user equipment 100 and the user and provide an output interface between the user equipment 100 and the user.

The speaker 152 may output audio data received from the wireless transceiver 110 or stored in the memory 170 in a call signal reception mode, a phone-call mode, a recording mode, a voice recognition mode, or a broadcasting reception mode.

The speaker 152 may include at least one of a receiver, a speaker, and a buzzer.

The haptic actuator 153 may generate various tactile effects that the user may feel. A representative example of the tactile effect generated by the haptic actuator 153 may be vibration.

The LED 154 outputs a signal for notifying occurrence of an event using light of a light source of the user equipment 100. Examples of the event generated in the user equipment 100 may be message reception, call signal reception, missed call, alarm, schedule notification, email reception, and information reception through an application.

The I/O connector 160 serves as a pathway between various types of external devices which are connected to the user equipment 100. The I/O connector 160 may include at least one of a wired/wireless headset port, an external charger port, a wired/wireless data port, a memory card port, a port which connects a device equipped with an identification module, an audio input/output (I/O) port, a video input/output (I/O) port, or an earphone port. The user equipment 100 may perform appropriate control related to the connected external device in accordance with the connection of the external device to the I/O connector 160.

The identification module is a chip in which various information for authenticating a usage right of the user equipment 100 is stored, and may include a user identification module (UIM), a subscriber identity module (SIM), and a universal subscriber identity module (USIM). The device with an identification module (hereinafter, "identification device") may be manufactured as a smart card. Accordingly, the identification device may be connected to the user equipment 100 through the I/O connector 160.

The memory 170 stores data which supports various functions of the user equipment 100.

The memory 170 may store various application programs (or applications) driven in the user equipment 100, data for the operation of the user equipment 100, commands, and data (for example, at least one algorithm information for machine learning) for the operation of the learning processor 130.

The memory 170 may store the trained model in the learning processor 130 or the learning device 200.

If necessary, the memory 170 may store the trained model by dividing the model into a plurality of versions depending on a training timing or a training progress.

In this case, the memory 170 may store input data obtained from the input interface 120, learning data (or training data) used for model learning, a learning history of the model, and so forth.

In this case, the input data stored in the memory 170 may not only be data which is processed to be suitable for the model learning but also input data itself which is not processed.

In addition to the operation related to the application program, the processor 180 may generally control an overall operation of the user equipment 100. The processor 180 may process a signal, data, or information which is inputted or outputted through the above-described components, or drive the application programs stored in the memory 170 to provide or process appropriate information or functions to the user.

Further, in order to drive the application program stored in the memory 170, the processor 180 may control at least some of components described with reference to FIG. 2. Moreover, the processor 180 may combine and operate at least two of components included in the user equipment 100 to drive the application program.

Meanwhile, as described above, the processor 180 may control an operation related to the application program and an overall operation of the user equipment 100. For example, when the state of the user equipment 100 satisfies a predetermined condition, the processor 180 may execute or release a locking state which restricts an input of a control command of a user for the applications.

The power supply 190 is applied with external power or internal power to supply the power to the components included in the user equipment 100 under the control of the processor 180. The power supply 190 includes a battery and the battery may be an embedded battery or a replaceable battery.

Figure 3:
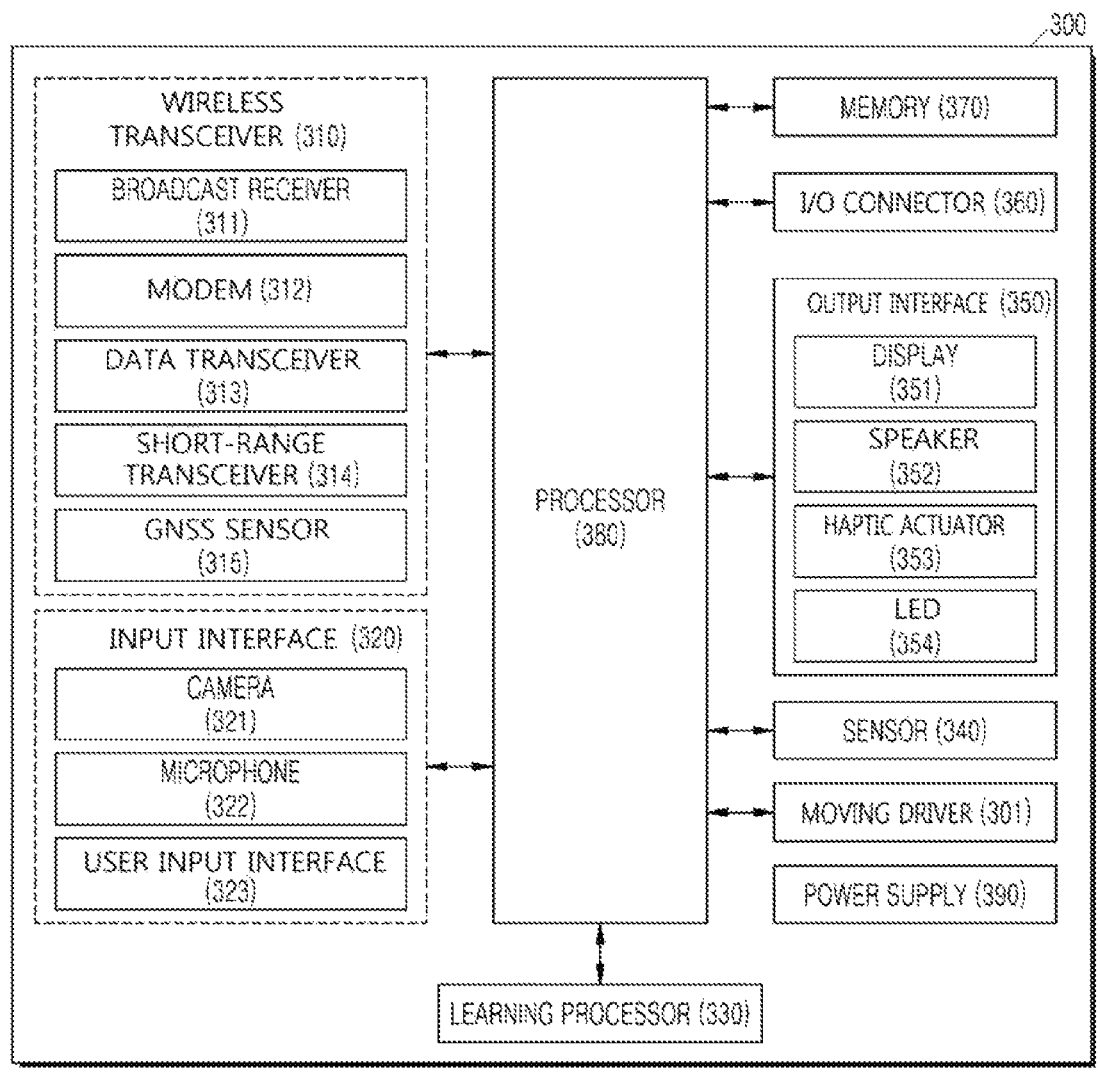
FIG. 3 is a block diagram of the equipment using human recognition according to an embodiment of the present disclosure.

FIG. 3 is a block diagram of the equipment using human recognition according to an embodiment of the present disclosure.

Comparing FIG. 3 with FIG. 2, the robot 300 of FIG. 3 may be configured to further include a moving driver 301, compared to the user equipment 100 of FIG. 2. The moving driver 301 may be implemented in the form of a wheel or a leg joint of a humanoid robot.

Unless the configuration of the robot 300 goes significantly beyond the range of the configuration of the user equipment 100, where components of the robot 300 are the same as those of the user equipment 100, the description on the components of the user equipment 100 may be applied to components of the robot 300.

Figure 4:
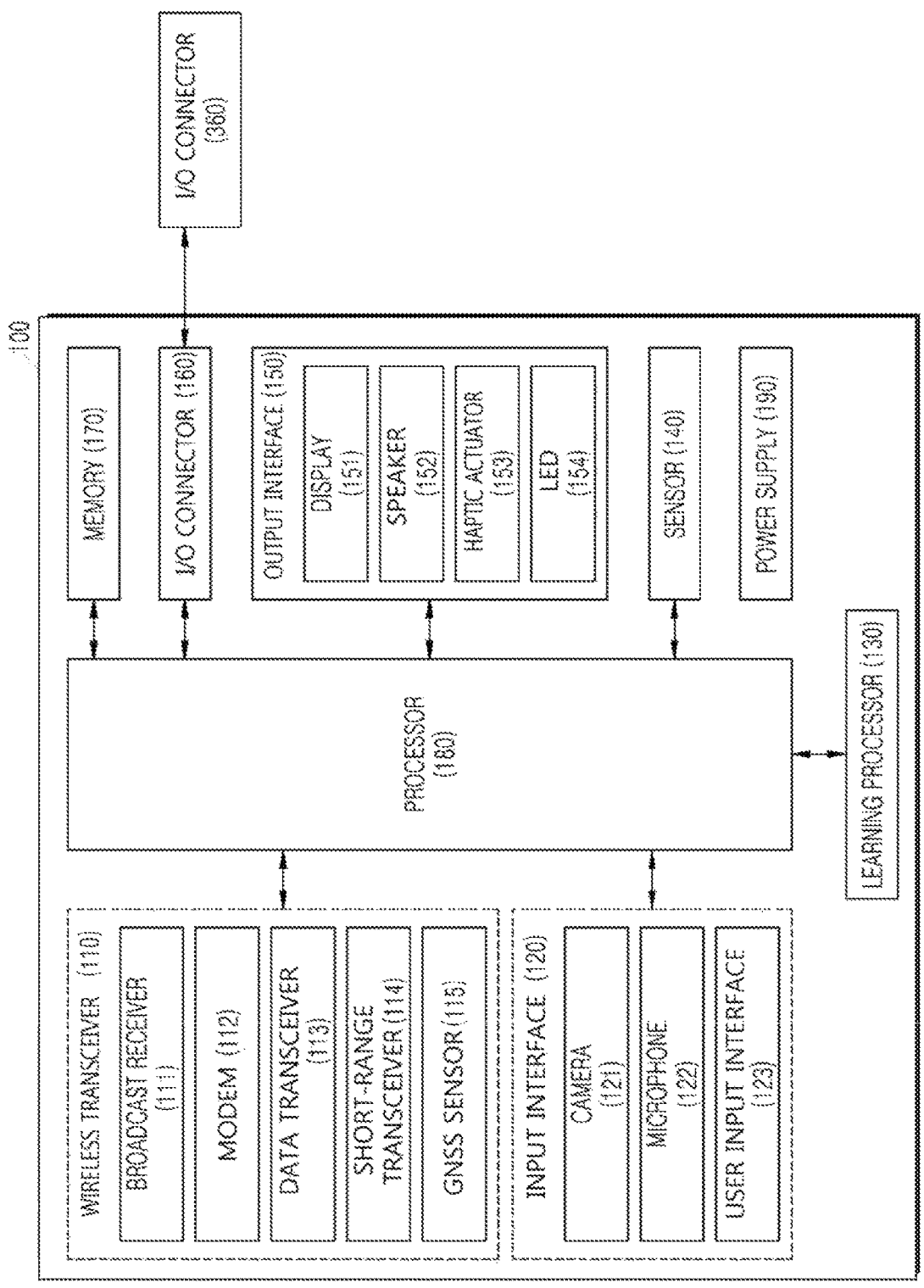
FIG. 4 is a block diagram of the equipment using human recognition according to an embodiment of the present disclosure.

FIG. 4 is a block diagram of the equipment using human recognition according to an embodiment of the present disclosure.

Referring to FIG. 4, another embodiment of the equipment using human recognition is shown. The user equipment 100 may be connected by wire to the robot 300 via the I/O connector 160 or 360, or connected to the robot 300 via the short-range transceiver 114 or 314 shown in FIG. 2 or 3, such as a Bluetooth module. In this case, the robot 300 may photograph an image using a function of the camera 121 of the user equipment 100.

Figure 5:
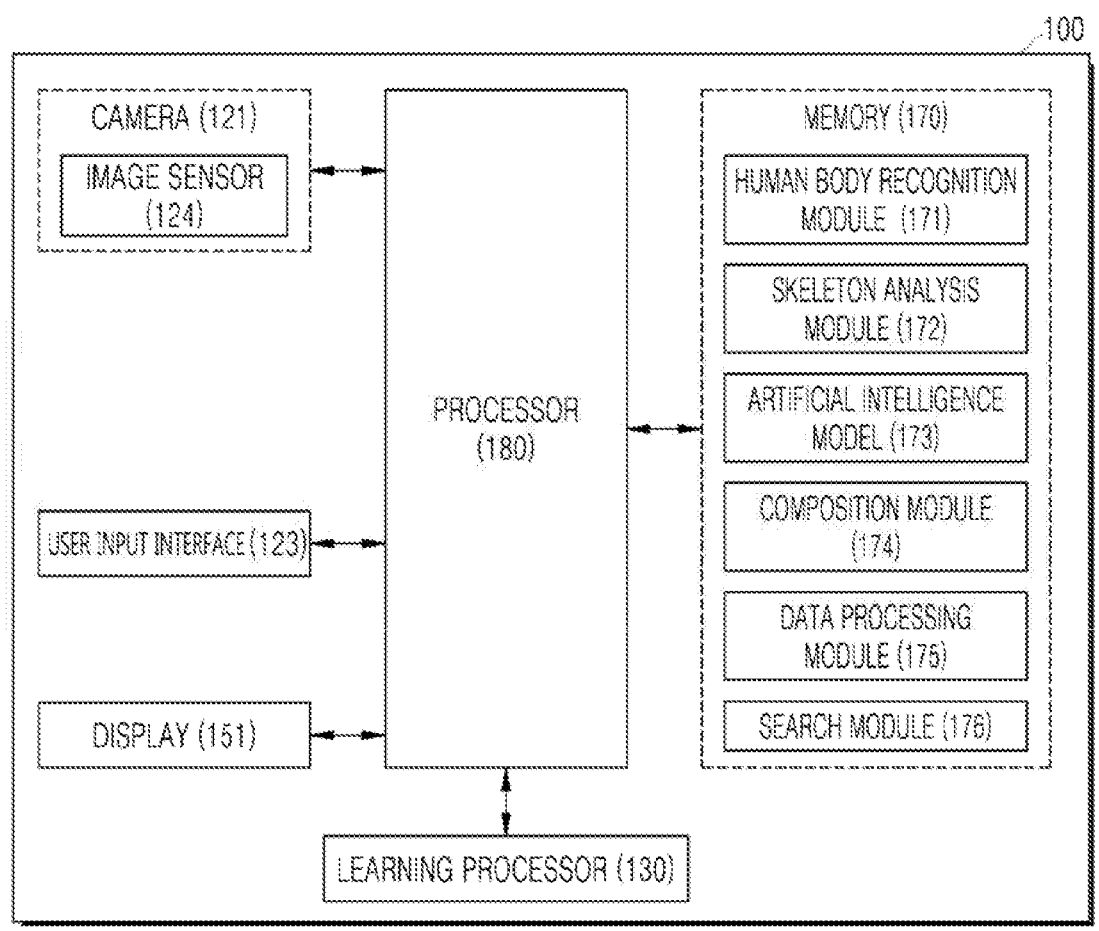
FIG. 5 is a block diagram displaying components of a memory, excluding some components of FIG. 2.

FIG. 5 is a block diagram displaying components of a memory in detail, excluding some components of FIG. 2.

Referring to FIG. 5, components of the memory 170 included in the user equipment 100 are briefly shown. Various computer program modules may be loaded in the memory 170. Computer programs loaded in the memory 170 may include a human body recognition module 171, a skeleton analysis module 172, an artificial intelligence model 173, a composition module 174, a data processing module 175, and a search module 176 as application programs, in addition to a system program that manages an operating system and hardware. Here, some of the application programs may be implemented as hardware such as an integrated circuit (IC).

The processor 180 may be set to control each of the modules 171 to 176 loaded in the memory 170. According to the setting, corresponding functions are performed via each of the modules 171 to 176.

Each of the modules 171 to 176 may be set to include a set of commands for each function constituting a method for utilizing human recognition according to an embodiment of the present disclosure. Functions of respective modules may be performed by the user equipment 100 while various logic circuits included in the processor 180 read and execute a command set of various modules loaded in the memory 170.

The human body recognition module 171 may search for a human body in an input image, recognize the human body according to a result of the search, and finally recognize a face. Hereinafter, a face recognition process according to an embodiment of the present disclosure will be described.

The face recognition process includes extracting a frame in a moving image, detecting a face area in a moving image frame, extracting a face feature in the face area, determining a similarity between face features, and forming a cluster for each cluster subject based on the similarity.

In a face recognition method in the related art, the extracted face feature is compared with a face feature stored in a database, and a person corresponding to the face feature, that is, a name of the person, is outputted.

However, unlike the related art, the face recognition process according to an embodiment of the present disclosure includes a process of determining a similarity between face features. Through comparison between frames, a section in which a similar face recognized in consecutive frames appears may be extracted.

In a process in which a moving image is newly generated, moving image information is extracted from the newly generated moving image, and a moving image database is updated using the moving image information, reference data for face recognition, that is, a face feature database, may not be prepared in advance. For example, in a case in which a person newly appears in a moving image, when a tag is not set for the person even though the person has appeared in a past moving image, and a movie in the moving image is newly released, a face feature database needed for face recognition may not be prepared.

In an embodiment of the present disclosure, the user equipment 100 may determine a similarity between face features of a person who appears in a moving image using a clustering model, and form a cluster of similar persons. A cluster is formed for each person, and a corresponding person becomes a subject of each cluster. In addition, a cluster subject ID for distinguishing between clusters may be assigned to a cluster subject.

A clustering model may be implemented as an artificial neural network for executing machine learning. By using a clustering model, a similarity may be determined for each person who appears in a frame based on a face feature, and information about a section in which the person appears may be extracted by collecting frames in which face features having a threshold similarity or greater are displayed.

Various face recognition algorithms may be used for face area detection and face recognition. Examples of algorithms that may be used are as follows.

One example is a method in which an input image is compared with a reference image stored in a database based on geometrical features of a face, and it is determined whether the input image matches the reference image. Since a face is three-dimensional and rotatable, this method is limited in its application.

Another example is the Eigenfaces algorithm, which was developed by Pentland in 1991. In the Eigenfaces algorithm, principal component analysis (PCA) is adopted for feature extraction, and Euclidean distance is adopted for similarity measurement. The Eigenfaces algorithm reacts sensitively to a change in lighting or environment, but is nonetheless a widely used method of which performance is verified.

Another example is the Fisherfaces algorithm, which is a face recognition method in which a Fisher linear discriminant (FLD) is adopted as a classification algorithm. By learning characteristics of individual people, the Fisherfaces algorithm is insensitive to environmental changes, and relatively accurate. Thus, the Fisherfaces algorithm may be adopted in real time in an online state.

Another example is a support vector machine (SVM) based algorithm, which uses PCA and SVM algorithms Although such an algorithm shows a comparatively high recognition rate, it has a weakness in that much time and memory are consumed in applying the algorithm to multi-class classification such as face recognition. However, such an algorithm is among the algorithms that are recently being actively researched.

Another example is a method for recognizing a face using a neural network, in which a face shape learned using a sliding window in a black and white still image is searched for by a neural network. In such a method, although two or more faces may be extracted, the speed is low and learning is difficult.

Another example is a method for recognizing a face using a fuzzy and neural network, in which a fuzzy membership function is used as an input to a circuit of a neural network, instead of a brightness value of a pixel. Although this algorithm shows improved performance over a method using only a neural network, it has a weakness in that the processing speed is low.

Another example is a face recognition algorithm using wavelet and elastic matching, in which frequency scaling is used. Such a method is effective for processing changes in posture and facial expression. However, this algorithm also has a weakness in that it requires many operations relative to the recognition rate.

The skeleton analysis module 172 obtains skeleton information based on shape analysis of a human body.

Motion capture systems recognizing a behavior of a human have been researched and developed based on various technologies such as optical, magnetic, or mechanical motion capture systems, and are currently being used. In an optical motion capture system, a marker is used. In a magnetic motion capture system, a device and a sensor forming an electrical magnetic field are used to capture rotation and movement values of the sensor in real time. In a mechanical motion capture system, data is received from a rotational sensor attached to a human body. A sensor is attached to correspond to three axes (X, Y, and Z axes) at each joint, and a rotation value is processed and recognized using a gyro sensor.

The user equipment 100 according to an embodiment of the present disclosure analyzes a human shape using the skeleton analysis module 172 based on an image captured in a visible light area, without having to use an optical marker, a magnetic device forming a magnetic field, or a mechanical rotational sensor.

In an embodiment of the present disclosure, the skeleton analysis module 172 recognizes positions of a crown of a head and a jaw among human body parts, and positions of joints located in bilaterally symmetrical positions of the human body, among joints of the human body, based on shape analysis of the human body. For example, the skeleton analysis module 172 may recognize positions of at least both shoulders, both elbows, both wrists, both buttocks, both knees, and both ankles, based on angles of joints and a distance between the joints obtained through analysis of a human body shape. Positions of the crown of the head, and the jaw are based on face recognition.

Here, the user equipment 100 may include the artificial intelligence model 173. The artificial intelligence model 173 may be trained to recognize the bilaterally symmetrical positions of the crown of the head and the jaw among human body parts, and the joints located in a bilaterally symmetrical position of the human body described above, for example, by using machine learning. In one embodiment, the artificial intelligence model 173 may be completed by undergoing a learning process and an evaluation process in the server 200, which is the learning device 200, and stored in the memory 170 of the user equipment 100.

In addition, the stored artificial intelligence model 173 may undergo a second learning process using user log data collected from the user equipment 100 to thereby recognize various patterns originating from features of an image collected through the user equipment 100.

The composition module 174 determines a photographing composition based on skeleton information. In detail, the composition module 174 extracts coordinate information of human body parts using the skeleton information, searches for a shot mode in which photographing may be performed based on the extracted coordinate information, and displays a found photographing composition in an image. Further details about determination of a photographing composition will be described later.

The data processing module 175 updates a moving image database by processing data of a newly stored video file. In detail, the data processing module 175 determines an update time at which the moving image database is to be updated, based on a user setting or time information and determination of an idle mode. Then, when a periodic update time comes, the data processing module 175 updates the moving image database, starting from extraction of a frame from a newly stored moving image file.

The search module 176 detects information matching a search condition by searching for text and multimedia data, for example, photographs, music files, and moving images, using a search engine. In this case, a search engine stored in the memory 170 of the user equipment 100 or the server 200 may be used.

As a result of learning, the server 200 may recognize various objects, particularly, a shape of a human body. Further, the server 200 may provide learning data needed to train an artificial intelligence model recognizing features of individual faces, and a computer program related to various artificial algorithms, such as an API and data workflows, to the terminal 100.

In addition, the server 200 collects, via the user terminal 100, learning data needed for learning in recognition of objects, a human body shape, and an individual face, in the form of user log data. Then, the server 200 may provide an artificial intelligence model directly trained using the collected learning data to the user terminal 100. Accordingly, the server 200 may be referred to as the learning device 200.

Figure 6:
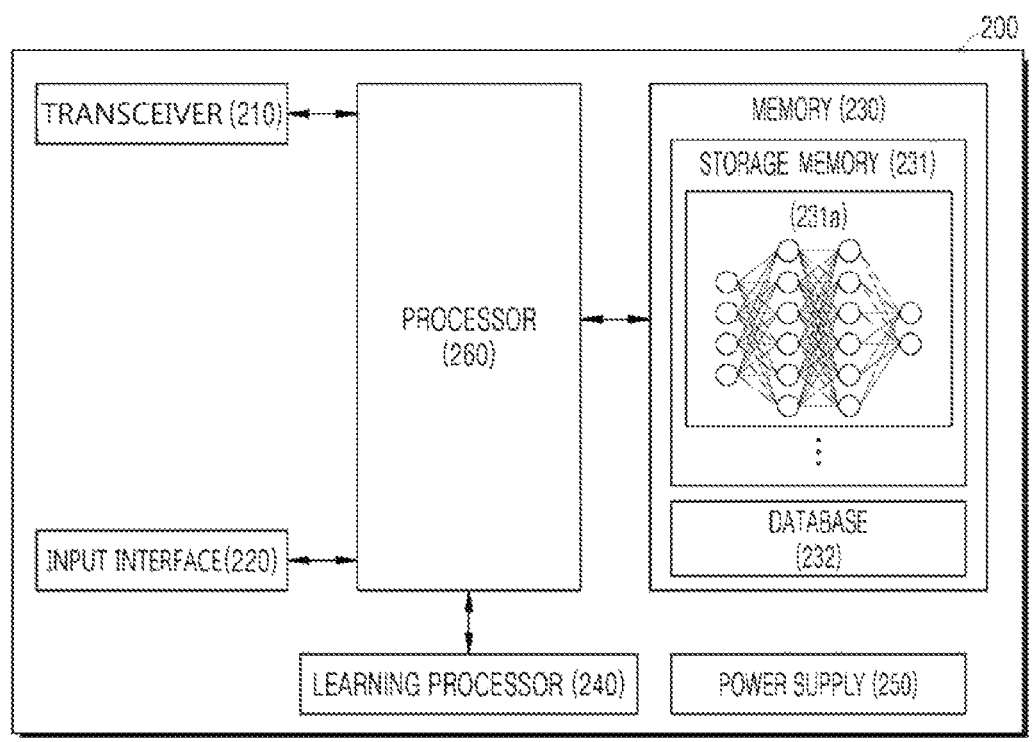
FIG. 6 is a block diagram illustrating a configuration of a server corresponding to a learning device of an artificial intelligence (AI) model according to an embodiment of the present disclosure.

FIG. 6 is a block diagram illustrating a configuration of a server corresponding to a learning device of an artificial intelligence (AI) model according to an embodiment of the present disclosure.

Referring to FIG. 6, the learning device 200 is a device or a server which is separately configured at the outside of the user equipment 100 and may perform the same function as the learning processor 130 of the user equipment 100.

That is, the learning device 200 may be configured to receive, classify, store, and output information to be used for data mining, data analysis, intelligent decision making, and machine learning algorithms Here, the machine learning algorithm may include a deep learning algorithm.

The learning device 200 may communicate with at least one terminal 100 and derive a result by analyzing or learning the data on behalf of the terminal 100. Here, "on behalf of the other device" may refer to a distribution of computing power by means of distributed processing.

The learning device 200 of the artificial neural network may be various devices for learning an artificial neural network, and normally refers to a server. The learning device 200 may be referred to as a learning device or a learning server.

Specifically, the learning device 200 may be implemented as a single server or as a plurality of server sets, a cloud server, or a combination thereof.

That is, the learning device 200 may be configured as a plurality of learning devices to configure a learning device set (or a cloud server), and at least one learning device 200 included in the learning device set may derive a result by analyzing or learning the data through distributed processing.

The learning device 200 may transmit a model trained by machine learning or deep learning to the user equipment 100 periodically or upon request.

Referring to FIG. 6, the learning device 200 may include a transceiver 210, an input interface 220, a memory 230, a learning processor 240, a power supply 250, a processor 260, and so forth.

The transceiver 210 may correspond to a configuration including the wireless transceiver 110 and the I/O connector 160 of FIG. 2. That is, the communicator may transmit and receive data with the other device through wired/wireless communication or an interface.

The input interface 220 is a configuration corresponding to the input interface 120 of FIG. 2 and may obtain data by receiving the data through the transceiver 210.

The input interface 220 may obtain data such as training data for training a model, and input data used to obtain an output using the trained model.

The input interface 220 may obtain unprocessed input data, and in this case, the processor 260 may preprocess the obtained data to generate training data to be inputted to the model learning or preprocessed input data.

In this case, the preprocessing on the input data performed by the input interface 220 may refer to extracting of an input feature from the input data.

The memory 230 is a configuration corresponding to the memory 170 of FIG. 2.

The memory 230 may include a storage memory 231, a database 232, and so forth.

The storage memory 231 stores a model (or an artificial neural network 231*a*) which is learning or trained through the learning processor 240 and when the model is updated through the learning, stores the updated model.

If necessary, the storage memory 231 may store the trained model by dividing the model into a plurality of versions depending on a training timing or a training progress.

The artificial neural network 231*a* illustrated in FIG. 6 is one example of an artificial neural network including a plurality of hidden layers, but the artificial neural network of the present disclosure is not limited thereto.

The artificial neural network 231*a* may be implemented as hardware, software, or a combination of hardware and software, and when the artificial neural network 231*a* is partially or entirely implemented as software, at least one command constituting the artificial neural network 231*a* may be stored in the memory 230.

The database 232 stores input data obtained from the input interface 220, learning data (or training data) used for model learning, a learning history of the model, and so forth.

The input data stored in the database 232 may be data which is processed to be suitable for model training, as well as unprocessed input data.

The learning processor 240 is a configuration corresponding to the learning processor 130 of FIG. 2.

The learning processor 240 may train the artificial neural network 231*a* using training data or a training set.

The learning processor 240 may train the artificial neural network 231*a* by immediately acquiring preprocessed input data that the processor 260 has obtained through the input interface 220, or obtain preprocessed input data stored in the database 232.

Specifically, the learning processor 240 may repeatedly train the artificial neural network 231*a* using various learning techniques described above to determine optimized model parameters of the artificial neural network 231*a*.

In this specification, an artificial neural network of which parameters are determined by being trained using training data may be referred to as a trained model.

Here, the trained model may be loaded in the learning device 200 to deduce result values, or may be transmitted to and loaded in other devices, such as the terminal 100, through the transceiver 0.

Further, when the trained model is updated, the updated trained model may be transmitted to and loaded in other devices, such as the terminal 100, via the transceiver 210.

The power supply 250 is a configuration corresponding to the power supply 190 of FIG. 2.

Redundant description for corresponding configurations will be omitted.

In addition, the learning device 200 may evaluate the artificial intelligence model and update the artificial intelligence model for better performance even after the evaluation, and provide the updated artificial intelligence model to the user equipment 100. Here, the user equipment 100 may perform a series of steps performed by the learning device 200 solely in a local area or together with the learning device 200 through the communication with the learning device 200. For example, the user equipment 100 may teach the artificial intelligence model a personal pattern of the user through training with the user's personal data, and thereby update the artificial intelligence model which is downloaded from the learning device 200.

Figure 7:
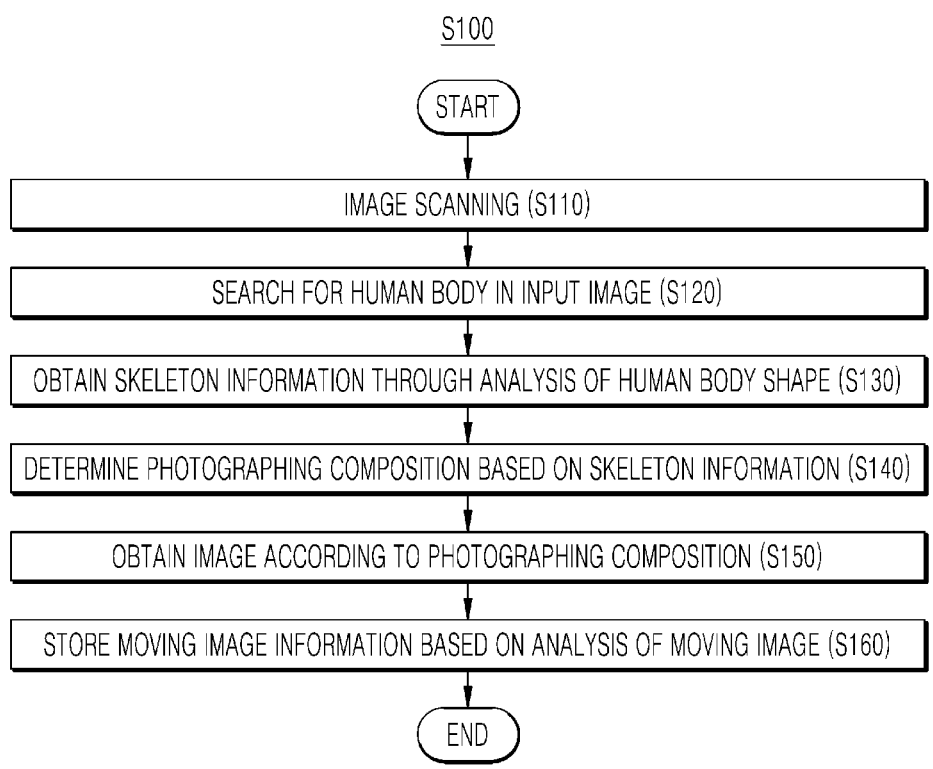
FIG. 7 is a flowchart of a method for utilizing human recognition according to an embodiment of the present disclosure.

FIG. 7 is a flowchart of a method for utilizing human recognition according to an embodiment of the present disclosure.

Referring to FIG. 7, a method for utilizing face recognition (S100) according to an embodiment of the present disclosure may be configured to include operations S110 to S160. In addition, each operation may be performed by the user equipment 100 or the robot 300 independently, or by operating in conjunction with the server 200.

Here, the subject performing the respective operations constituting the method for using face recognition (S100) is the user equipment 100 or 300 using human recognition, that is, the user equipment 100 or the robot 300. In detail, the subject performing the respective operations constituting the method for using face recognition (S100) is the processor 180 or 380 configured to execute a set of computer commands for controlling the method for using human recognition included in a program stored in the memory 170 or 370.

The processor 180 or 380 may be implemented as at least one of a central processing unit (CPU) or a graphics processing unit (GPU). Hereinafter, each operation will be described in terms of the processor 180, which is the subject executing the method for using face recognition according to an embodiment of the present disclosure.

According to a set control by the processor 180, an image is scanned via the camera 121 in the user terminal 100 (S110). An image scanned in an image sensor area may be inputted to an area of the memory 170 according to a control by the processor 1180, and stored.

The processor 180 searches for a human body area in the input image using the human body recognition module 171 (S120). The processor 180 may search for a human body area in the input image by using the various algorithms described above.

The processor 180 obtains skeleton information using the skeleton analysis module 172 configured to perform analysis of a human body shape. In detail, the processor 180 recognizes positions of a crown of a head, a jaw, and at least both shoulders, both elbows, both wrists, both buttocks, both knees, and both ankles among human body parts, using a shape of a human body and a distance between joints.

Particularly, the processor 180 may analyze a human body shape using the artificial intelligence model 173. In addition, the artificial intelligence model 173 may be an artificial neural network model trained to recognize positions of a crown of a head, a jaw, and at least both shoulders, both elbows, both wrists, both buttocks, both knees, and both ankles among human body parts, through deep learning.

The processor 180 determines a photographing composition based on skeleton information using the composition module 174 (S140).

Figure 8:
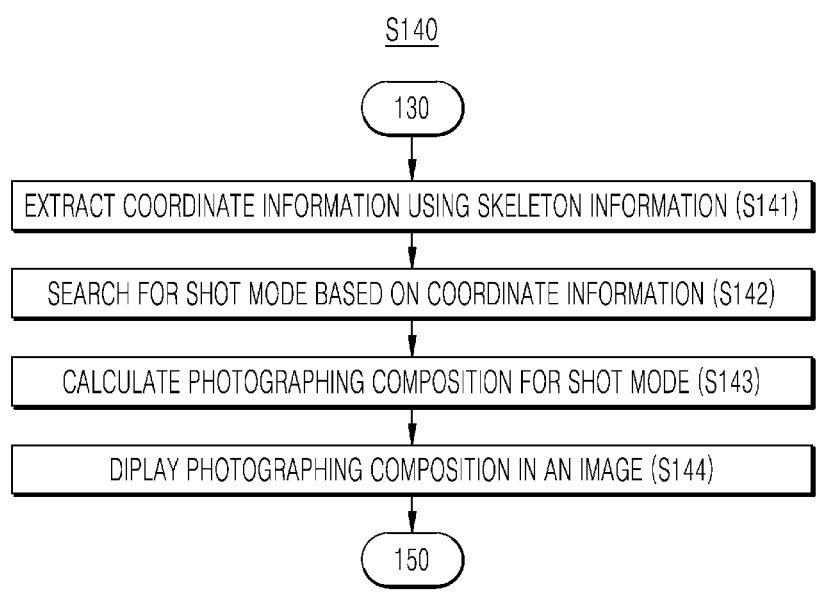
FIG. 8 is a flowchart illustrating determination of a photographing composition according to an embodiment of the present disclosure.

FIG. 8 is a flowchart illustrating determination of a photographing composition according to an embodiment of the present disclosure.

Referring to FIG. 8, the determining of the photographing composition (S140) may include extracting coordinate information using skeleton information (S141), searching for a shot mode in which photographing may be performed based on the coordinate information (S142), calculating a photographing composition for each shot mode (S143), and displaying the photographing composition in an image (S144).

The processor 180 extracts coordinate information using the skeleton information (S141). The skeleton information is a result of analysis of a human body shape, and includes information about positions of a crown of a head, a jaw, both shoulders, both elbows, both wrists, both buttocks, both knees, and both ankles in a human body area represented in an image. Here, the processor 180 extracts pixel information of an area in which a human body part is located, such as coordinate information of a pixel.

Figure 9:
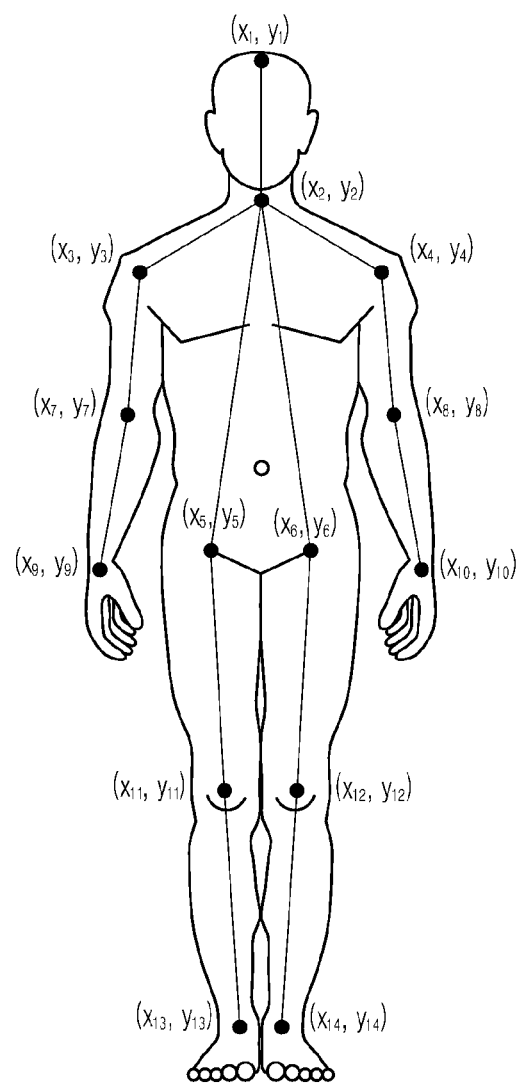
FIG. 9 is an exemplary view of human skeleton information according to an embodiment of the present disclosure.

FIG. 9 is an exemplary view of human skeleton information according to an embodiment of the present disclosure.

FIG. 9 shows an entire shape of a human body in which coordinates of human body parts based on skeleton information are displayed. According to an embodiment of the present disclosure, a position and a rotational direction of a head needed to determine a camera composition may be recognized through position information of a crown of a head and a jaw.

The processor 180 searches for a shot mode in which photographing may be performed based on coordinate information (S142). The processor 180 searches for a shot mode in which photographing may be performed according to human body parts, based on coordinate information of the human body parts shown in an image. The searching for a shot mode may include searching for at least one shot mode selected from a full shot mode, a knee shot mode, a waist shot mode, and a bust shot mode.

In addition, the processor 180 calculates a photographing composition for each of the at least one shot mode in which photographing may be performed, according to a control operation of the camera 121 by a user. Particularly, the processor 180 may recognize an inclination of the user equipment 100 using the sensor 140, and calculate a horizontal photographing composition suited for a human body part that is a subject, based on the inclination.

The processor 180 may display the photographing composition in an image by controlling the display 151.

Figure 10:
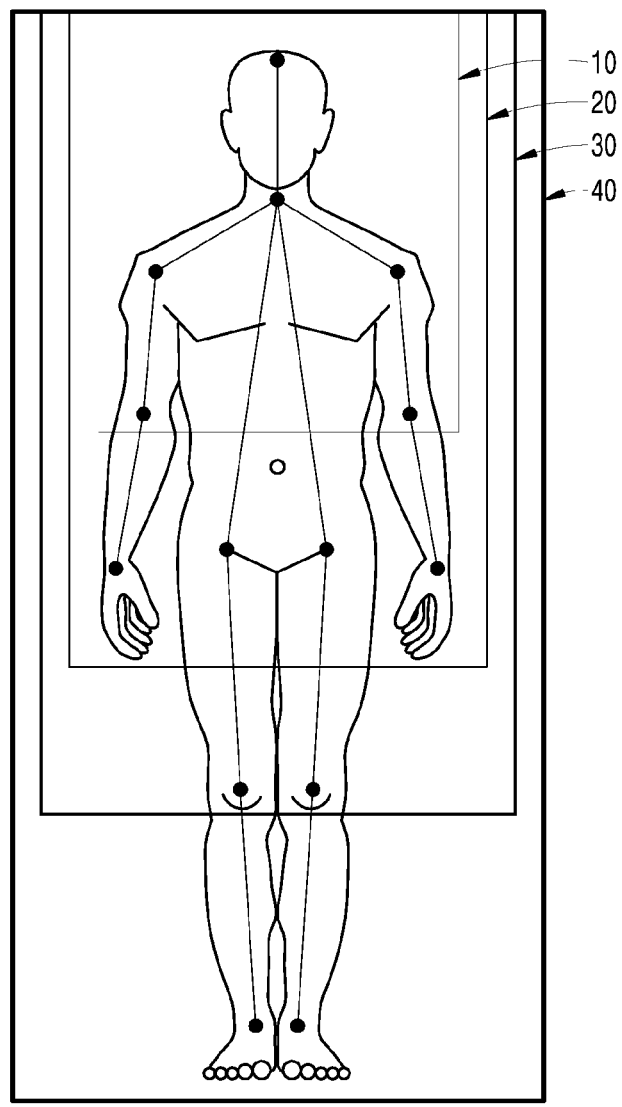
FIG. 10 is an exemplary view of each shot mode in which photographing may be performed, according to an embodiment of the present disclosure.

FIG. 10 is an exemplary view of each shot mode in which photographing may be performed, according to an embodiment of the present disclosure.

Referring to FIG. 10, a bust shot 10, a waist shot 20, a knee shot 30, and a full shot 40 in which photographing may be performed are displayed.

The processor 180 may obtain an image according to a photographing composition (S150). The obtaining of an image according to a photographing composition may include a half-shutter operation and a full-shutter operation by a user. For example, a photographing composition may be displayed in an image according to a half-shutter operation, and the image may be obtained according to a full-shutter operation.

A user may select a determined composition based on skeleton analysis. Then, when lens work of a camera occurs by the user's operation, an image is obtained according to the selected composition. Alternatively, regardless of control and selection by a user, a plurality of cameras 121 in the user equipment 121 may obtain an image suited for a photographing composition according to a shot mode in which photographing may be performed. Accordingly, an image according to the user's intention and an additional image may be obtained at same time, and stored in the memory 170.

Finally, the processor 180 may extract moving image information from a captured image, particularly, a moving image, and construct a database needed to search for a moving image using the extracted moving image information (S160).

Human body and face recognition technology may be utilized in searching for a captured image, in addition to determination of a photographing composition. Hereinafter, a method for searching for a moving image using face recognition technology is described.

Figure 11:
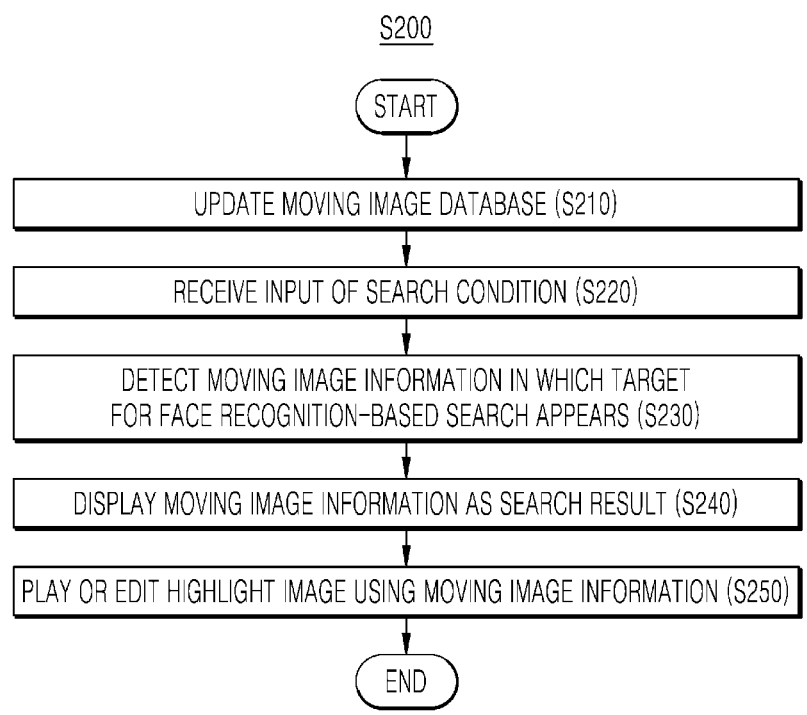
FIG. 11 is a flowchart illustrating a search for a moving image based on human recognition according to an embodiment of the present disclosure.

FIG. 11 is a flowchart of a method for utilizing human recognition according to an embodiment of the present disclosure.

FIG. 11 shows the method for using human recognition according to an embodiment of the present disclosure, that is, a method for searching for a moving image. The method includes operations S210 to S260.

There may be a case when the method for using human recognition according to an embodiment of the present disclosure is performed by the user equipment 100 or a case when the method for using human recognition according to an embodiment of the present disclosure is performed by the robot 300. In addition, when the method for using human recognition is performed by the user equipment 100, there may be a case when the method for using human recognition is performed by personal communication equipment in a local area, or a case when the method for using human recognition is performed by a client server model such as a server providing video streaming contents.

The user equipment 100 may search for section information related to moving image information matching a search condition, such as metadata set for a photograph or a moving image, that is, various tags and object appearance, by setting a scope of search to image contents captured through the camera 121 and stored in a local area, image contents downloaded through the wireless transceiver 110, and moving image contents inputted via the interface 170 and stored.

A user may search for video contents stored in a server providing video streaming contents, using the user equipment 100. For example, when video contents are movies, a search for video contents may be performed on various search conditions such as a movie title, a genre, a release date, starring actors, a movie rating, and a movie grade ranking. In addition, a title of a movie in which a particular actor stars, and section information of a scene in which the actor appears in the movie, may be further searched for.

While guiding visitors at, for example, an exhibition, the robot 300 may store images of the visitors in a local area or the server 200. The robot 300 may detect an image in which a particular person appears, from at least one image in which visitors appear. The robot 300 may play only sections in which the particular person appears as a highlight image, using moving image information that is a detection result. Alternatively, the robot 300 may generate a newly edited image by putting the sections together, and transmit the newly edited image to the user equipment 100.

One exemplary embodiment of the user equipment 100 will be described below as a representative example of the method for using human recognition according to an embodiment of the present disclosure.

The processor 180 may update a moving image database to include information about a moving image in which a cluster subject appears, wherein the moving image information is extracted based on clustering using a face feature (S210).

The processor 180 extracts a frame from a moving image using the human body recognition module 171, the artificial intelligence model 173, and the data processing module 175, recognizes a face area and a face in the frame, determines a similarity using a clustering model according to a result of the recognition, forms a cluster based on the similarity, and generates metadata regarding information about a section in which a cluster subject appears. That is, the processor 180 may extract moving image information including cluster subject information, and appearance section information, and update the database using the extracted moving image information.

Figure 12:
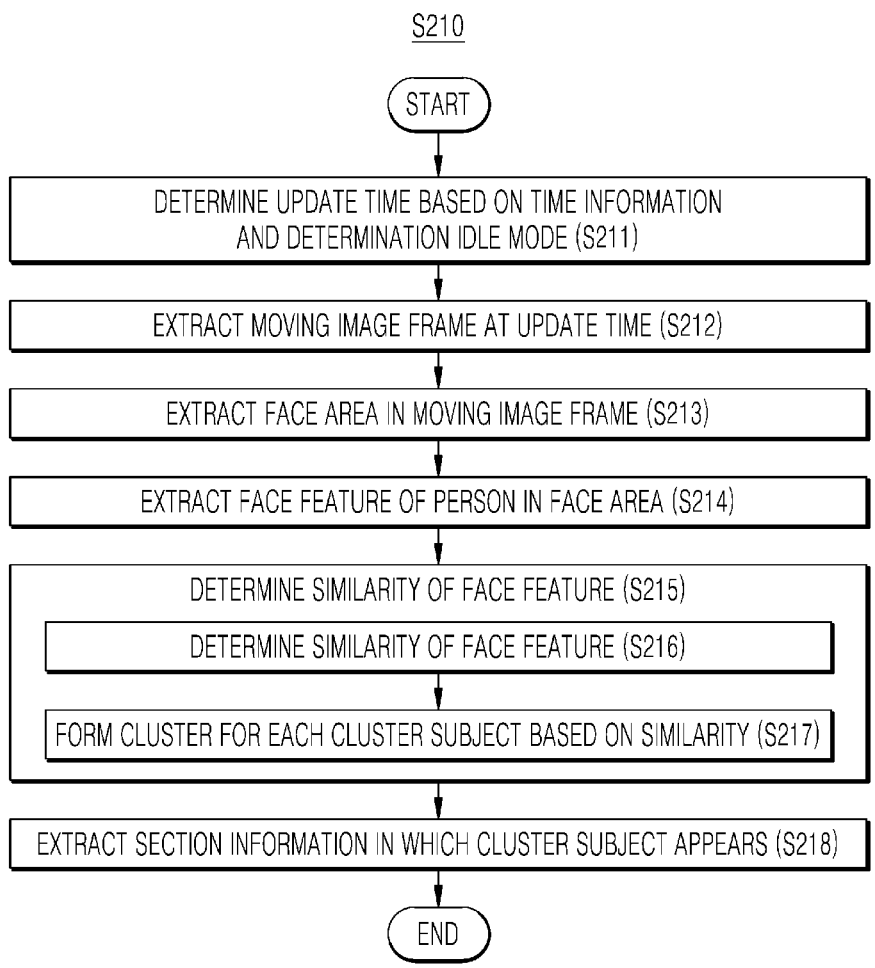
FIG. 12 is a flowchart of a process of updating a moving image database according to an embodiment of the present disclosure.

FIG. 12 is a flowchart of a process of updating a moving image database according to an embodiment of the present disclosure.

Referring to FIG. 12, a process of updating a database according to an embodiment of the present disclosure may be configured to include operations S211 to S217.

First, the processor 180 may determine an update time based on time information and determination of an idle mode (S211).

The user equipment 100 may enter the idle mode in which operation of the processor 180 is minimized due to application programs other than programs operating in the background not being executed, in accordance with the user being asleep. The user equipment 100 may determine an update time based on time information and determination of an idle mode. For example, when the current time is past midnight, the processor 180 may determine the update time as being near dawn. In addition, the processor 180 may determine, as the update time, the user's sleep time, a time at which amount of electricity is maintained at minimum when amount of electricity used for the user equipment 100 is checked, or a time when a user input via the user input interface 123 is not performed for a predetermined time period or greater.

The processor 180 may extract a moving image frame from a video file in which moving image information is not stored, that is, a new video file, among moving image files stored in the user equipment 100 (S212).

The processor 180 may extract a face area from the moving image frame. In detail, the processor 180 may search for a human body area in the extracted video frame, recognize an area of a face in a found human body area, and extract an image in which the face is displayed from the face area (S213).

The processor 180 may extract face features from the face area (S214). The processor 180 may extract a feature vector representing the face features from the face area of the frame. In a process of extracting a feature, a PCA algorithm may be used. Each feature is projected onto an axis by the PCA algorithm. An axis along which distribution is greatest is selected as a first main component, and an axis along which distribution is second greatest is selected as a second main component. By using such a method, data is linearly converted to be thereby reduced from multiple dimensions to a lower dimension. In addition, at least one selected from linear discriminant analysis (LDA), canonical correlation analysis (CCA), singular value decomposition, isometric mapping (ISOMAP), and locally linear embedding (LLE) may be used.

The processor 180 may form a cluster for each cluster subject using a clustering model based on the extracted face features and machine learning (S215). This process may be configured to include determining a similarity between the face features (S216) and forming a cluster based on the similarity (S217).

The processor 180 may determine a similarity between the face features using a clustering model based on machine learning (S216). The similarity is determined by face features extracted from a frame corresponding to the face features and a feature distance between formed clusters. The clustering model based on machine learning may determine whether persons are the same person according to a feature distance represented as a probability value. That is, the clustering model based on machine learning may determine persons having a feature distance within a threshold as the same person.

The clustering model based on machine learning receives an input of two frames including a first frame and a second frame, determines a similarity between a first person shown in the first frame and a second person shown in the second frame, and outputs both persons are the same person' or both persons are not the same person'. Since the clustering model performs a processing process on each person, the clustering model may also determine sameness with respect to a plurality of persons. Metadata representing the same cluster subject, that is, a tag, may be added to a frame for which sameness is determined.

The processor 180 may form a cluster for each cluster subject based on the similarity (S217).

The artificial intelligence model 173, that is, a clustering model performing machine learning, extracts face features according to training using learning data, and forms a cluster for each similar face feature to thereby cluster persons shown in the extracted frame.

Figure 13:
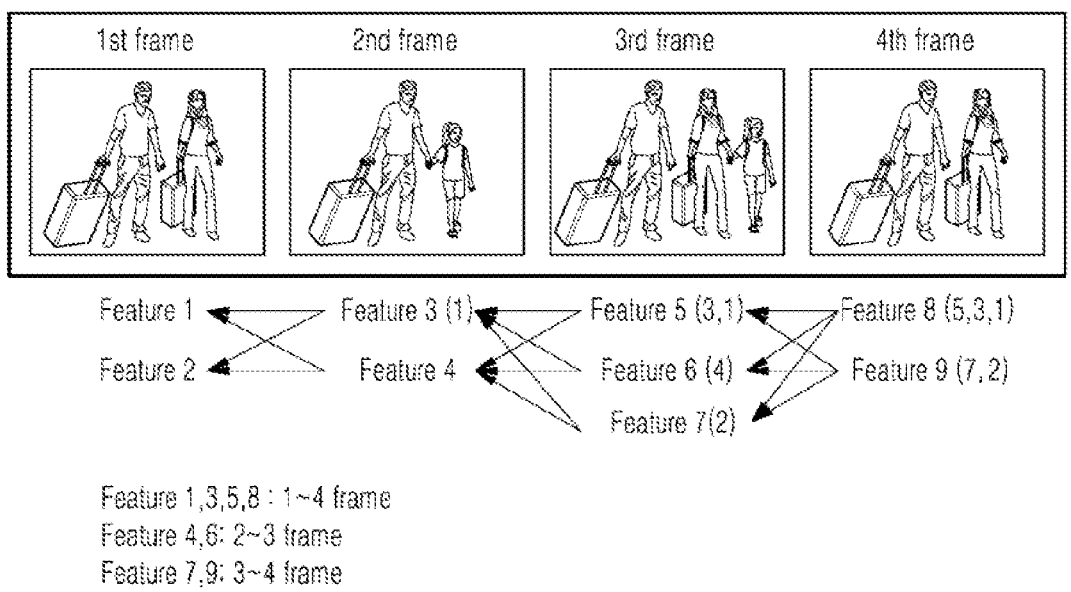
FIG. 13 is an exemplary view illustrating similarity-based clustering using a clustering model according to an embodiment of the present disclosure.

FIG. 13 is an exemplary view illustrating similarity-based clustering using a clustering model according to an embodiment of the present disclosure.

Referring to FIG. 13, four frames extracted from a moving image in which three people, for example, a father, a mother, and a daughter appear, are shown as an example. Numerals shown for the three people who appear in a frame are to denote a person in the frame to describe the person. In addition, Features 1 to 9 correspond to face features of persons who appear in a moving image in FIG. 13.

A process in which the robot 300 captures an image of a person who is a visitor to an exhibition, stores the captured image, and updates a moving image database using the stored image is described as an example, wherein the robot 300 is one example of equipment using human recognition according to an embodiment of the present disclosure.

As one example of equipment using human recognition, the robot 300 is here assumed to be a guide robot 300 disposed at an airport lobby. The guide robot 300 may guide passengers preparing for departure or undergoing an entry process at the airport lobby, and capture an image in a process of the guiding. The robot 300 extracts face features using the clustering model 173 and form clusters for respective subjects of the extracted face features to thereby distinguish the subjects of the clusters from each other.

The robot 300 may extract four frames showing time differences from the captured moving images, recognize an object appearing in the moving images, particularly, a human body, search for a face area, and extract a face feature from a found face area. Here, Features 1 to 9 may be extracted as features of each face.

The robot 300 may control a clustering model according to an artificial intelligence model stored in a memory, for example, a neural network performing machine learning. In addition, the clustering model may distinguish the father from the mother using Feature 1 and Feature 2 extracted from the first frame.

The clustering model may distinguish the father from the daughter using Feature 3 and Feature 4 extracted from the second frame. In addition, the clustering model may infer that Feature 1 and Feature 3 are features of the same person by determining a similarity between Features 3 and 4 and features extracted from the first frame.

The clustering model may distinguish the father, the mother, and the daughter with each other using Feature 5 and Feature 7 extracted from the third frame. In addition, the clustering model may infer that Feature 5, Feature 3 and Feature 1 are features of the same person by comparatively analyzing Features 5 to 7 with analysis results of the first and second frames. In addition, the clustering model may infer that Feature 6 and Feature 4 are features of the same person and Feature 7 and Feature 2 are features of the same person.

The clustering model may distinguish the father and the mother using Feature 8 and Feature 9 extracted from the fourth frame. In addition, the clustering model may infer that Feature 8, Feature 5, Feature 3 and Feature 1 are features of the same person by comparatively analyzing Features 8 and 9 with analysis results of the first, second, and third frames. In addition, the clustering model may infer that Feature 9, Feature 7, and Feature 2 are features of the same person.

By using this method, when the robot 300 does not know names of persons appearing in moving images, the robot 300 may distinguish subjects of clusters with each other using face features by controlling the clustering model. When subjects of clusters are distinguished from each other and subjects of clusters appearing in a frame are determined, metadata regarding the subjects of the clusters, such as tags, are determined in the frame.

Figure 14:
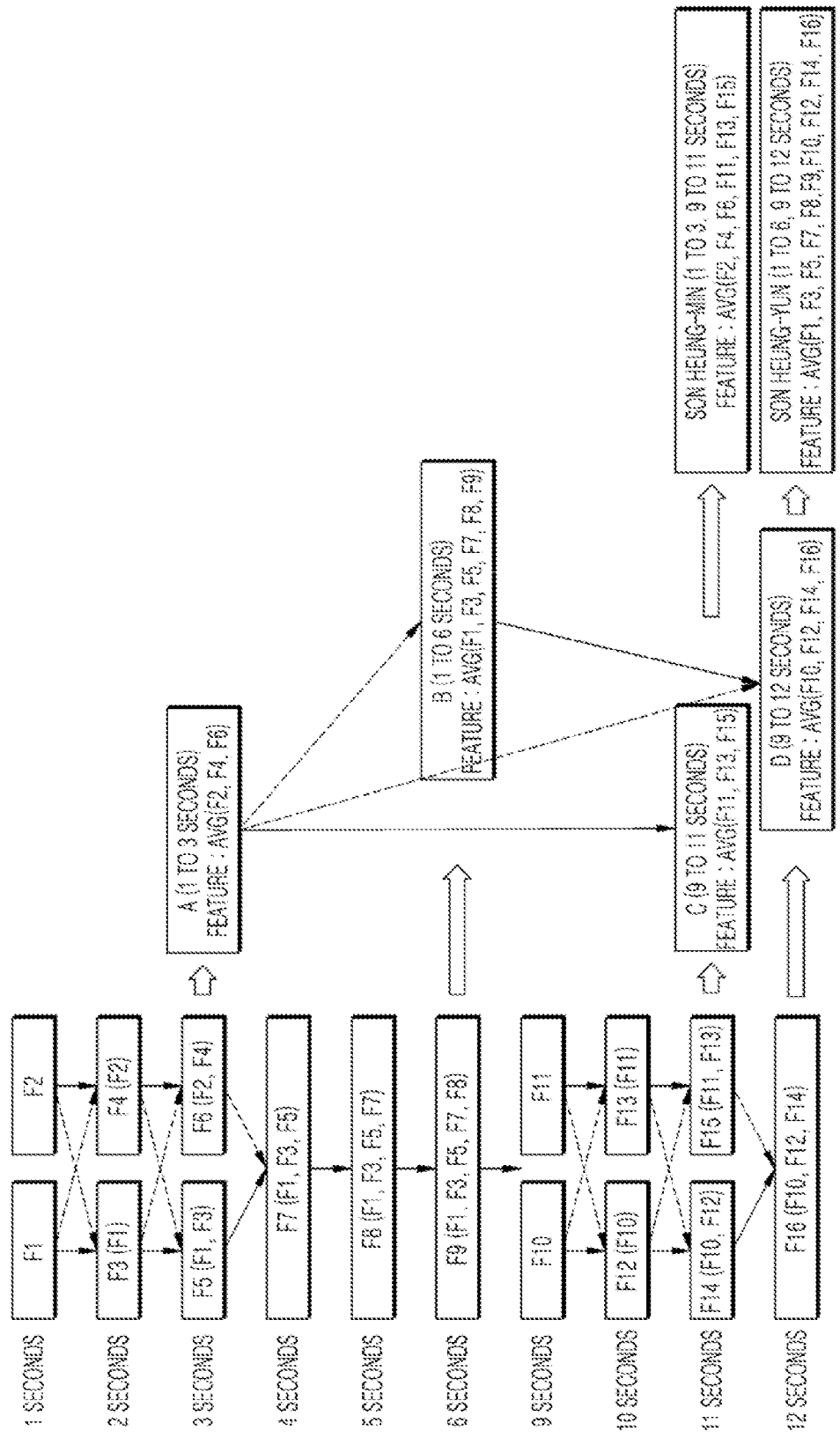
FIG. 14 is an exemplary view illustrating similarity-based clustering using a clustering model according to an embodiment of the present disclosure.

FIG. 14 is an exemplary view illustrating similarity-based clustering using a clustering model according to an embodiment of the present disclosure.

Referring to FIG. 14, a process of extracting information about moving images using a clustering model based in a similarity between face features extracted from the moving images in which two people appear is shown. Such moving image extraction work may be performed by the user equipment 100, for example, mobile equipment 100 on a photographed video file, or equipment providing an image contents service with respect to stored image files.

The processor 180 may extract six frames in a section from 1 to 6 seconds and four frames in a section from 9 to 12 seconds from the moving images. In addition, face features may be extracted for each person appearing in each frame. The extracted face features are denoted as F1 to F16.

The processor 180 measures a similarity between face features F1 to F6 extracted from three frames between 1 to 3 seconds, and cluster persons into clusters of the face features F1, F3, and F5 and clusters of the face features F2, F4, and F6 using a result of the measurement. The processor 180 may include face features F7, F8, and F9 appearing in a section from 4 to 6 seconds in the same cluster as that of face features F1, F3, and F5 based on the similarity.

Then, the processor 180 may form a new cluster using features of persons appearing in a section from 9 to 12 seconds. That is, the processor 180 may additionally form a cluster of features F11, F13 and F15 and another cluster of F10, F12, F14, and F16.

Finally, the processor 180 may infer that a cluster A is the same person as a cluster C, and a cluster B is the same person as a cluster D, by determining a similarity between four clusters formed in a section from 1 to 12 seconds. This example shows a documentary video about Son Heung-min, a soccer player. The processor 180 may classify Son Heung-min and his brother, Son Heung-yun into clusters A and C and clusters B and D, respectively.

The processor 180 may extract information on a section in which a subject of the cluster appears using frame information in which the subject of the cluster appears, together with the forming of the cluster (S218).

In detail, after a tag of the subject of the cluster is finalized, appearance information regarding a section in which the subject of the cluster appears may be finalized according to whether the same tag persists. To recognize that a subject of a cluster appears in the corresponding section, a minimum appearance time of the subject of the cluster may be set. For example, when the subject of the cluster is shown in consecutive frames for four seconds, it may be deemed that the subject of the cluster appears for four seconds.

Based on a similarity of a face feature between subjects of clusters extracted from a frame, the processor 180 may finalize section information that is time information regarding a section in which the subject of the cluster having the face features appears.

Clustering is one machine learning technique based on unsupervised learning, among several machine learning techniques. According to a clustering principle, a cluster may be formed for each face feature of a person appearing a moving image frame. A clustering model may distinguish identities of persons appearing in the moving images from each other using numerals provided according to a predetermined rule.

The processor 180 may store a tag of the subject of the cluster and section information regarding appearance of the subject of the cluster. In detail, the processor 180 may update a moving image database by storing moving image information including a tag of the subject of the cluster appearing in a frame extracted from the moving image and section information regarding appearance of the subject of the cluster corresponding to a tag that persists for threshold time or longer.

According to the storing of new moving image information through the above-described process, when the moving image database is updated, a process of searching for moving images may be performed by the user equipment 100 or 300.

First, the processor 180 receives an input of face features of a search target as a search condition (S220).

The input of face features may be performed using a method for directly inputting a tag regarding the search target. For example, when a profile reference is defined in a moving image database constructed through a process of analyzing moving images stored in the user equipment 100, a tag assigned to an appearing person may be directly inputted by selecting a search target, that is, the appearing person, from a list of people, instead of inputting face features.

In a case in which equipment using human recognition according to an embodiment of the present disclosure is implemented as the robot 300, when it is not known which tag is assigned to the search target, inputting a tag corresponding to a feature of a person as a search condition may not be permitted.

When tag assignment for distinguishing people from each other is not known, face features may be inputted according a method for directly inputting an image in which the search target appears or a method for selecting a person from a list of people extracted from profile reference of a pre-constructed moving image database.

In detail, the processor 180 may extract face features through a process of recognizing a human body and a face, and extracting a face area from an image of a person captured using the camera 121.

In addition, the processor 180 may receive an input of a search condition by selecting at least one search target from candidates for a search target provided based on profile reference classified an AI model, such as a cluster model performing deep learning according to a user input.

Then, the processor 180 detects information about a moving image in which the subject of the cluster that matches a face feature inputted based on face recognition appears, from the moving image database (S230). When an identity of the subject of the cluster corresponding to the search target is recognized, the processor 180 may extract moving image information regarding the subject of the cluster that matches the search target from a pre-constructed and updated moving image database.

The processor 180 may display the moving image information as a result of the search for moving images (S240).

The inputting of the search condition for searching for moving image information and the displaying of the search result may be shown in different embodiments according to a scope of the search. When a client server model providing video streaming contents is used, there may be a case when section information in a moving image played by a user that is a client is searched for and a case when a particular actor is searched for as a search condition. In addition, there may be a case when a user searches for section information in a particular file and a case when a particular person is searched for as a search condition. In addition, there may be a case when a particular visitor is searched for in a moving image in which the visitor appears and section information as a search condition. Such cases will be described with reference to the drawings.

Figure 15:
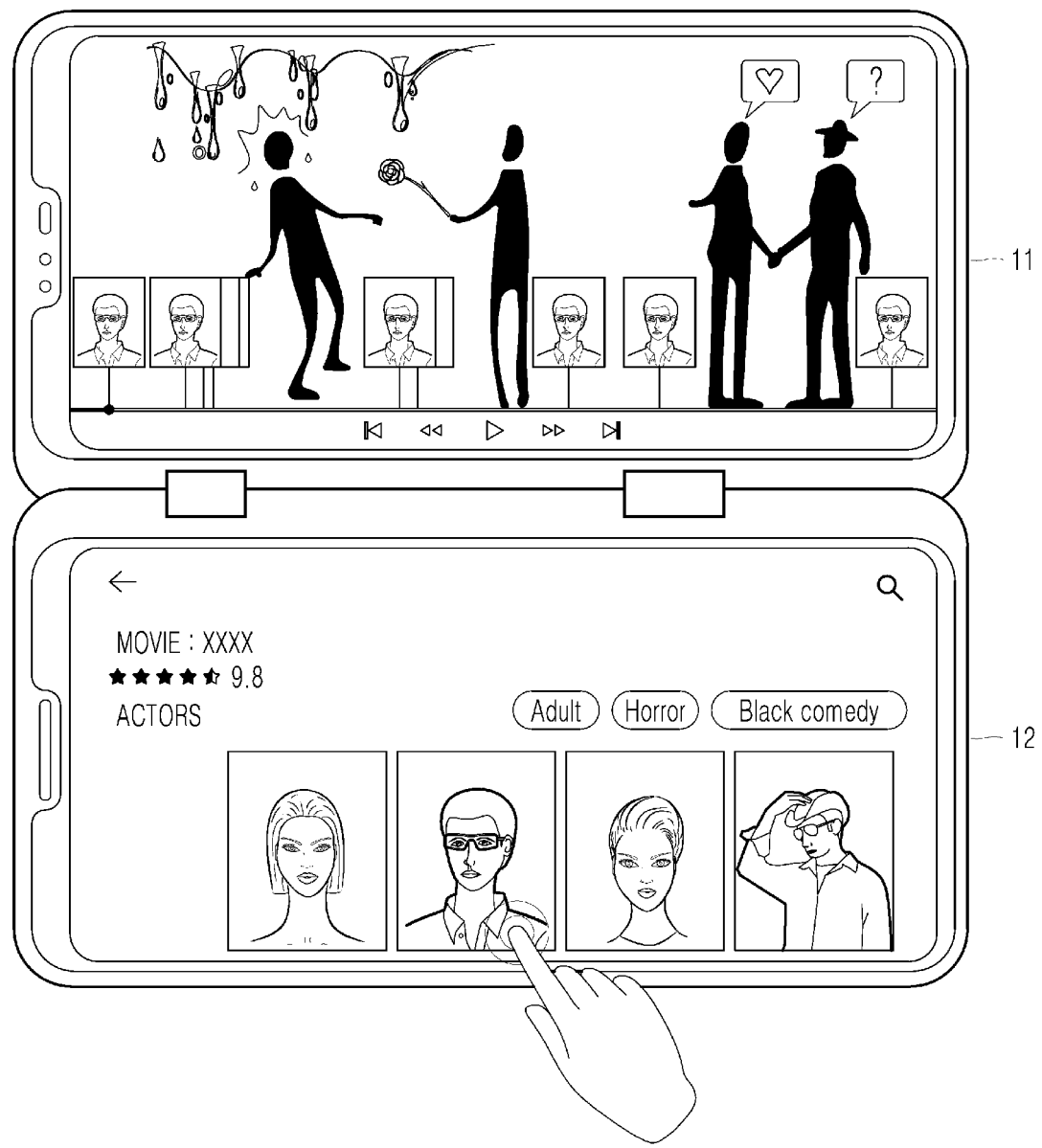
FIG. 15 is a view illustrating a user interface (UI) for utilizing moving image information according to an embodiment of the present disclosure.

FIG. 15 is a view illustrating a UI for utilizing moving image information according to an embodiment of the present disclosure.

FIG. 15 is a view of a UI for utilizing moving image information that includes information about a section in which a cluster subject, for example, an actor, appears, according to an embodiment of the present disclosure. An upper view 11 shows a UI of a progress bar in which section information is displayed. A lower view 12 shows a UI for an input of controlling a touch panel using a thumbnail of a particular actor to display section information in which the actor appears. In this case, when a thumbnail of an actor who is a cluster subject is selected, section information in which the actor appears may be displayed on a playback bar on a screen in which a move is played according to a time order.

As such, the user may search for section information in which an actor or a person appears in a moving image among moving images provided according to a video streaming service via personal communication equipment or present in a local area, and immediately play the section using the section information. In addition, the robot 300 may search for appearance information of a person inputted in a search condition.

Figure 16:
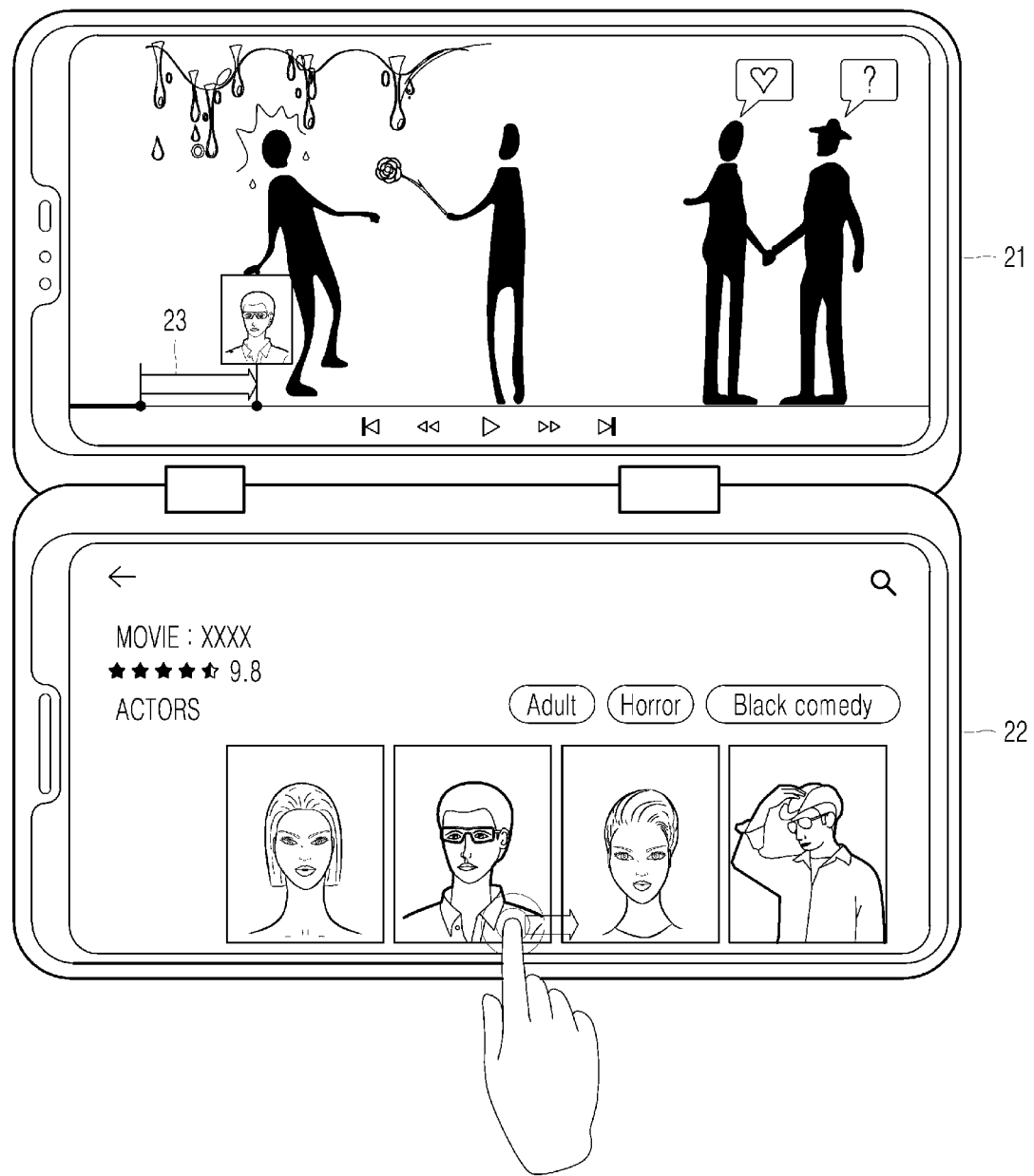
FIG. 16 is a view illustrating a UI for utilizing moving image information according to an embodiment of the present disclosure.

FIG. 16 is a view illustrating a UI for utilizing moving image information according to an embodiment of the present disclosure.

FIG. 16 is a view of a UI for utilizing moving image information that includes information about a section in which a cluster subject, for example, an actor, appears, according to an embodiment of the present disclosure. FIG. 15 is distinguished from FIG. 14 in that FIG. 16 shows a touch panel control command using a swipe operation while a moving image, that is, a movie file, is played. When the touch panel control command is inputted to the equipment according to the swipe operation via a thumbnail of an actor who is a cluster subject, as section information in which an actor appears before or after a playback time point according to a direction of the swipe operation, that is, a left side or a right side, is displayed on a playback bar, a playback point may be changed to a starting point of the section in which the actor appears.

As such, the user may search for previous or subsequent section information in which an actor or a person appears in a moving image that is being played among moving images provided according to a video streaming service via personal communication equipment or present in a local area, and immediately play the section using the section information. In addition, the robot 300 may play the appearance section using information about a section in which the cluster subject appears, according to a result of the search.

Figure 17:
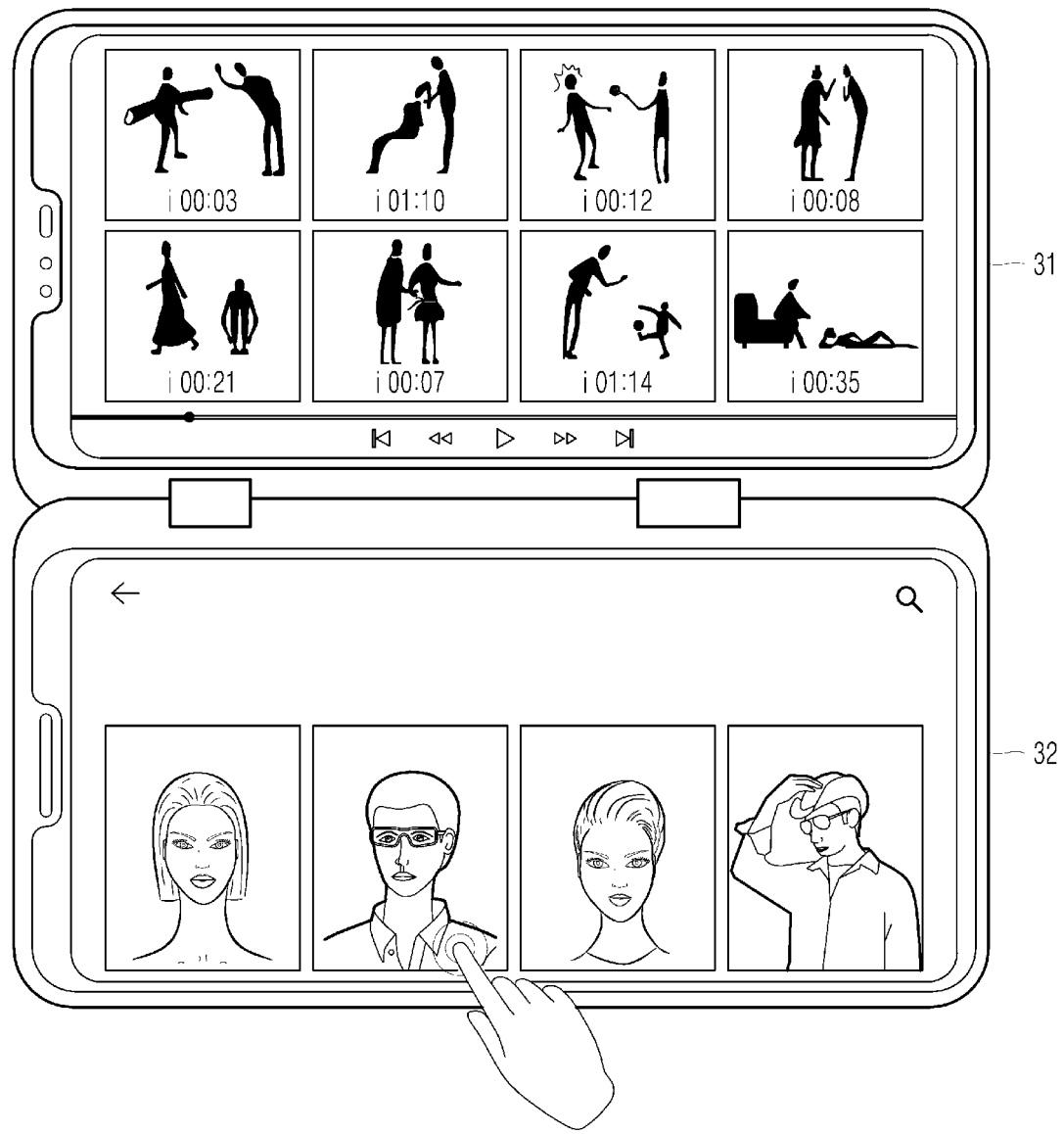
FIG. 17 is a view illustrating a UI for utilizing moving image information according to an embodiment of the present disclosure.

FIG. 17 is a view illustrating a UI for utilizing moving image information according to an embodiment of the present disclosure.

FIG. 17 is a view of a UI for utilizing moving image information that includes information about a section in which a cluster subject, for example, an actor, appears, according to an embodiment of the present disclosure. FIG. 17 is distinguished from FIGS. 15 and 16 in that FIG. 17 is a view illustrating a moving image file in which a particular cluster subject, for example, an actor in a movie or a particular person in a family appears, and a result of a search for information about a section in which the particular cluster subject appears in the moving image file. A user may complete a search condition by inputting a name of an actor or a name or a meta code of a person in a moving image, or directly inputting an image including a feature of a search target person. The processor 180 may search for a cluster subject and appearance information of the cluster subject that match a search condition using a pre-constructed moving image database including moving image information based on the search condition. In addition, the user equipment 100 may display information about a section in which the cluster subject appears in the moving image together with moving ID information and section information as a thumbnail. Here, the section information is information regarding a frame in which a person appears. When a playback command is inputted into a thumbnail corresponding to the section information, a section in which the person appears may be immediately played.

Various menus may be configured using a search result through other mobile gestures, such as a finger operation such as a tap, a double tap, a drag, a flick, a pinch, a press, or rotation.

As such, the user may search for previous or subsequent section information in which an actor or a person appears in a moving image that is being played among moving images provided according to a video streaming service via personal communication equipment or present in a local area, and immediately play the section using the section information. In addition, the robot 300 may play the appearance section using information about a section in which the cluster subject appears, according to a result of the search.

Then, the processor 180 may play a highlight image or edit an image using moving image information (S250). The moving image may be played from a beginning to an end for a purpose of a search for the moving image. Alternatively, sections of the moving image in which a particular person appears may be connected to each other to thereby play a highlight image, or put together to thereby generate an edited image. In the related art, a function of generating an album using a still image was used. However, a method for playing a moving image so that sections in which a search target that is a target of interest are connected to each other, among an entire moving image playback section of the moving image, has not been disclosed.

As such, equipment using human recognition according to various embodiments of the present disclosure may determine a photographing composition according to a shot mode through skeleton analysis, selectively play or edit a moving image by searching for sections in which a particular person appears based on face recognition, extract moving image information added at an edge of the equipment, and update a moving image database using the moving image information.

According to embodiments of the present disclosure, photographing may be performed according to a composition appropriately recommended for a rate of a recognized human body.

In addition, a composition suitable for a shot mode based human body recognition can be recommended to a user.

In addition, a personalized moving image album can be created by detecting sections of the moving image in which a particular person appears.

In addition, a photographing method based on recognition of a human body and a face may be applied to a robot for capturing an image at, for example, an exhibition.

It should be noted that the effects of the present disclosure are not limited to the effects mentioned above, and other unmentioned effects will be clearly understood by those skilled in the art from the above description of the present disclosure. The example embodiments described above may be implemented through computer programs executable through various components on a computer, and such computer programs may be recorded in computer-readable media. For example, the recording media may include magnetic media such as hard disks, floppy disks, and magnetic media such as a magnetic tape, optical media such as CD-ROMs and DVDs, magneto-optical media such as floptical disks, and hardware devices specifically configured to store and execute program commands, such as ROM, RAM, and flash memory.

The program commands recorded to the media may be components specially designed for the inventive concept or may be usable by one of ordinary skill in the art of computer software. Program commands include not only machine language code generated by a complier but also high level code that can be used by an interpreter etc., which is executed by a computer.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

The singular forms "a," "an" and "the" in this present disclosure, in particular, claims, may be intended to include the plural forms as well. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The steps of all methods described herein can be performed in any suitable order unless otherwise indicated herein or otherwise clearly contradicted by context. The use of any and all examples, or exemplary language (e.g., "such as") provided herein, is intended merely to better illuminate the inventive concept and does not pose a limitation on the scope of the inventive concept unless otherwise claimed. Additionally, it will be understood by those of ordinary skill in the art that various modifications, combinations, and changes can be formed according to design conditions and factors within the scope of the attached claims or the equivalents.

While the invention has been explained in relation to its embodiments, it is to be understood that various modifications thereof will become apparent to those skilled in the art upon reading the specification. Therefore, it is to be understood that the invention disclosed herein is intended to cover such modifications as fall within the scope of the appended claims.

The present disclosure described as above is not limited by the aspects described herein and accompanying drawings. It should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

What is claimed is:

1. A method for human recognition, the method comprising:
   determining an update time based on time information and a determination of being in an idle mode;
   determining whether a first moving image, of which moving image information of the first moving image is not stored in a moving image database, exists among moving images stored in a user equipment, in case of the updated time;
   extracting information from the first moving image in which a cluster subject appears in case the moving image information is not included in the moving image database, wherein the extracting is based on clustering using a face feature of the cluster subject depicted in the first moving image;
   storing, in the moving image database, the information from the first moving image;
   receiving a search condition for searching for moving images in which the cluster subject appears, wherein the moving images are included in the moving image database; and
   searching the moving image database to identify one or more moving images, among the moving images included in the moving image database, which meet the search condition.

2. The method of claim 1, further comprising:
   extracting a face feature of a person for each frame of the first moving image;
   forming a cluster for each cluster subject using the face feature and a clustering model based on machine learning;
   generating further information about a section in the first moving image in which the each cluster subject appears; and
   storing, in the moving image database, the further information.

3. The method of claim 2, wherein the forming of the cluster for each cluster subject comprises:
   determining a similarity of the face feature; and
   forming a cluster for each cluster subject based on the similarity.

4. The method of claim 1, further comprising:
   performing the searching using a face feature of a person as the search condition.

5. The method of claim 1, further comprising:
   performing the searching using as the search condition information about a person selected from a list of people extracted from the moving image database.

6. The method of claim 1, further comprising:
   displaying, on a display, information about the identified one or more moving images that includes at least one of a thumbnail, a moving image identification (ID), a person identification (ID), or information about a section in which a person appears.

7. The method of claim 1, further comprising:
   performing, according to a mobile gesture by a user, at least one of playing back a selected section in which a person appears, continuously playing back the selected section in which the person appears, and moving to and playing back another section in which the person appears.

8. The method of claim 1, further comprising:
   generating a highlight image using a moving image of a section in which the cluster subject appears, based on the information from the first moving image.

9. The method of claim 1, further comprising:
   generating a moving image edited using a moving image of a section in which the cluster subject appears, based on the information from the first moving image.

10. An apparatus for human recognition, the apparatus comprising:
    a user input interface; and
    a processor configured to:
    determine an update time based on time information and a determination of being in an idle mode;
    determine whether a first moving image, of which moving image information of the first moving image is not stored in a moving image database, exists among moving images stored in a user equipment, in case of the updated time;
    extract information from a first moving image in which a cluster subject appears in case the moving image information is not included in the moving image database, wherein the extract is based on clustering using a face feature of the cluster subject depicted in the first moving image;
    store, in the moving image database, the information from the first moving image;
    receive, via the user input interface, a search condition for searching for moving images in which the cluster subject appears, wherein the moving images are included in the moving image database; and
    search the moving image database to identify one or more moving images, among the moving images included in the moving image database, which meet the search condition.

11. The apparatus of claim 10, wherein the processor is further configured to:
    extract a face feature of a person for each frame of the first moving image;
    form a cluster for each cluster subject using the face feature and a clustering model based on machine learning;
    generate further information about a section in the first moving image in which the each cluster subject appears; and
    store, in the moving image database, the further information.

12. The apparatus of claim 11, wherein the form the cluster for each cluster subject comprises:
    determine a similarity of the face feature; and
    form a cluster for each cluster subject based on the similarity.

13. The apparatus of claim 10, wherein the processor is further configured to:
    perform the search using a face feature of a person as the search condition.

14. The apparatus of claim 10, wherein the processor is further configured to:
    perform the search using as the search condition information about a person selected from a list of people extracted from the moving image database.

15. The apparatus of claim 10, further comprising:
    a display, wherein the processor is further configured to:
    cause the display to display information about the identified one or more moving images that includes at least one of a thumbnail, a moving image identification (ID), a person identification (ID), or information about a section in which a person appears.

16. The apparatus of claim 10, wherein the processor is further configured to:
  perform, according to a mobile gesture by a user, at least one of playing back a selected section in which a person appears, continuously playing back the selected section in which the person appears, and moving to and playing back another section in which the person appears.

17. The apparatus of claim 10, wherein the processor is further configured to:
  generate a highlight image using a moving image of a section in which the cluster subject appears, based on the information from the first moving image.

18. The apparatus of claim 10, wherein the processor is further configured to:
  generate a moving image edited using a moving image of a section in which the cluster subject appears, based on the information from the first moving image.

\* \* \* \* \*